United States Patent
Segur

(10) Patent No.: US 8,173,235 B2
(45) Date of Patent: May 8, 2012

(54) METHOD AND APPARATUS HAVING FOUR SURFACES FOR SEALING DISTRIBUTION DUCTS

(76) Inventor: David G. Segur, St. Petersburg, FL (US)

( * ) Notice: Subject to any disclaimer, the term of this patent is extended or adjusted under 35 U.S.C. 154(b) by 587 days.

(21) Appl. No.: 12/343,444

(22) Filed: Dec. 23, 2008

(65) Prior Publication Data

US 2010/0154967 A1    Jun. 24, 2010

(51) Int. Cl.
F16L 21/00 (2006.01)
F16L 55/00 (2006.01)
B32B 1/00 (2006.01)
B32B 1/04 (2006.01)
B32B 33/00 (2006.01)
B32B 37/12 (2006.01)
B29C 65/50 (2006.01)

(52) U.S. Cl. ........ 428/40.1; 428/41.7; 428/83; 428/119; 428/121; 428/156; 428/343; 428/906; 285/136.1; 285/141.1; 285/133.21; 285/424; 277/312; 277/314; 277/625; 277/626; 277/644; 277/647

(58) Field of Classification Search ............. 285/133.21; 277/626; 52/716.8
See application file for complete search history.

(56) References Cited

U.S. PATENT DOCUMENTS

| | | | |
|---|---|---|---|
| 2,832,223 A * | 4/1958 | Couraud ................ 74/18.2 |
| 2,928,201 A * | 3/1960 | Shanok et al. .......... 428/379 |
| 3,109,670 A | 11/1963 | Engel |
| 3,214,807 A | 11/1965 | Hinden |
| 3,408,250 A | 10/1968 | Finefrock |
| 3,512,805 A | 5/1970 | Glatz |
| 3,836,181 A | 9/1974 | Kelver |
| 3,840,266 A * | 10/1974 | Carlson .................. 296/166 |
| 3,895,145 A | 7/1975 | McPherson |
| 3,958,313 A | 5/1976 | Rossborough |
| 4,175,756 A * | 11/1979 | Denton et al. ........... 277/644 |
| 4,183,557 A | 1/1980 | Hinden |
| 4,219,225 A * | 8/1980 | Sigmund ................ 285/47 |
| 4,294,476 A * | 10/1981 | Nash ..................... 285/189 |
| 4,317,516 A * | 3/1982 | Palmer-Ball, Sr. ....... 206/320 |
| 4,402,113 A | 9/1983 | Smith |
| 4,861,631 A | 8/1989 | Hinden et al. |
| 5,288,533 A * | 2/1994 | Remick, II ............. 428/45 |
| 5,476,564 A | 12/1995 | Botsolas |
| 5,538,293 A * | 7/1996 | Kolt ..................... 285/24 |
| 5,564,756 A * | 10/1996 | Hamilton ............... 285/222 |

(Continued)

FOREIGN PATENT DOCUMENTS

JP    2000-345114 A    12/2000

(Continued)

OTHER PUBLICATIONS

English Abstract for JP 2002323180 A, Nov. 2002.*

*Primary Examiner* — David R Sample
*Assistant Examiner* — Jeff Vonch
(74) *Attorney, Agent, or Firm* — Larson & Larson, P.A.; Frank Liebenow; Justin Miller

(57) ABSTRACT

An application for an arced sealing tape has a bottom, an inner wall and an outer wall. The outer wall has an outward flare extending outwardly from the center. The surfaces of the inner wall and the outer wall that are closest to a center point of the arc have an adhesive and a bottom surface of the bottom also has an adhesive.

20 Claims, 17 Drawing Sheets

U.S. PATENT DOCUMENTS

| | | | |
|---|---|---|---|
| 5,620,551 A | 4/1997 | Botsolas | |
| 5,653,482 A * | 8/1997 | Ficchi, Jr. | 285/405 |
| 5,667,224 A * | 9/1997 | Streckert et al. | 277/634 |
| 5,826,886 A * | 10/1998 | Hauff et al. | 277/314 |
| 5,948,509 A | 9/1999 | Felson | |
| 6,244,633 B1 * | 6/2001 | Warren | 285/424 |
| 6,444,307 B1 | 9/2002 | Tuoriniemi | |
| 6,505,864 B1 | 1/2003 | Shuey | |
| 7,097,804 B2 | 8/2006 | Frantz et al. | |
| 7,758,957 B2 * | 7/2010 | McTaggart | 428/343 |
| 2005/0058798 A1 * | 3/2005 | Sieber et al. | 428/40.1 |
| 2006/0027388 A1 | 2/2006 | Collins | |
| 2006/0061104 A1 | 3/2006 | Jungers | |
| 2006/0237963 A1 * | 10/2006 | More | 285/49 |
| 2007/0110943 A1 | 5/2007 | Sieber et al. | |

FOREIGN PATENT DOCUMENTS

JP    2002323180 A  *  11/2002

* cited by examiner

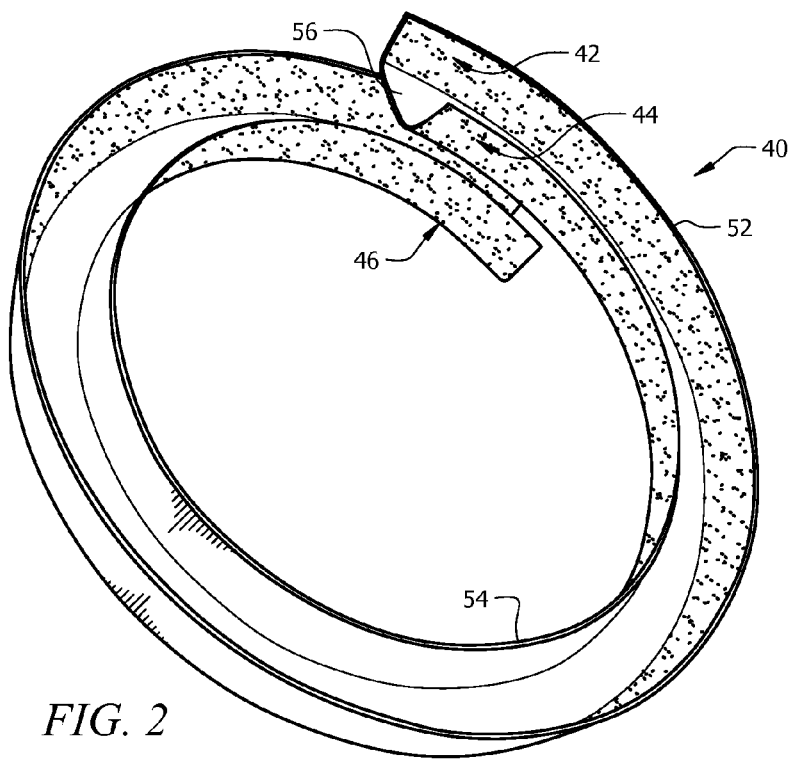
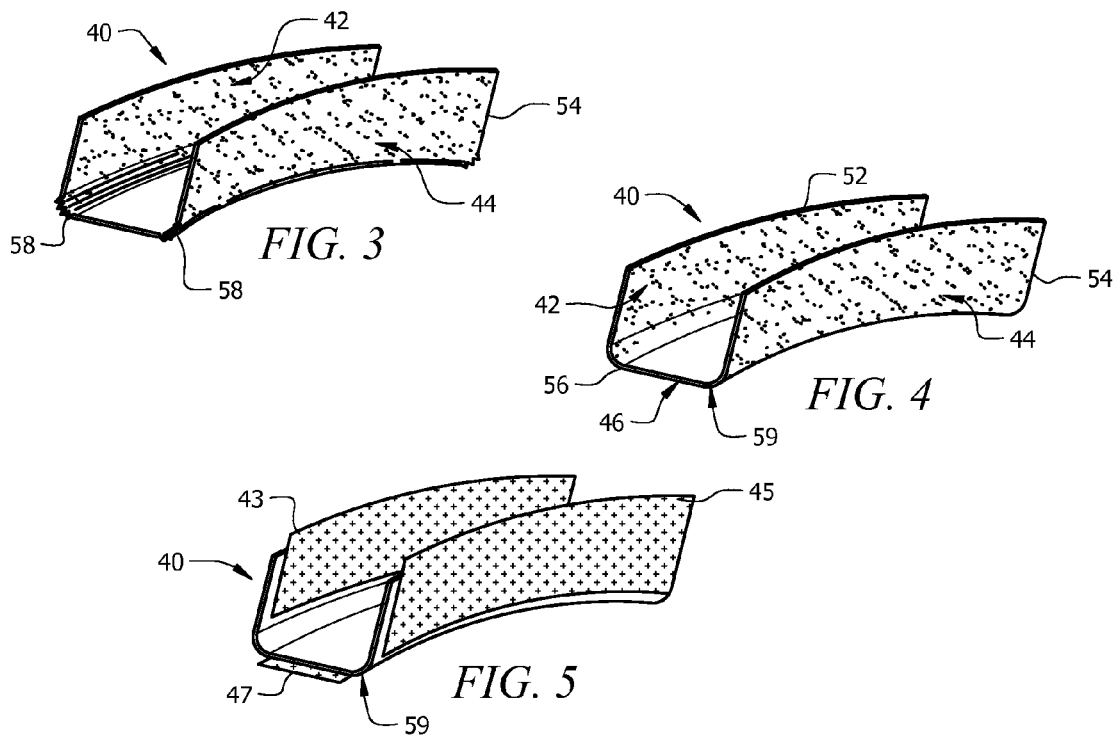

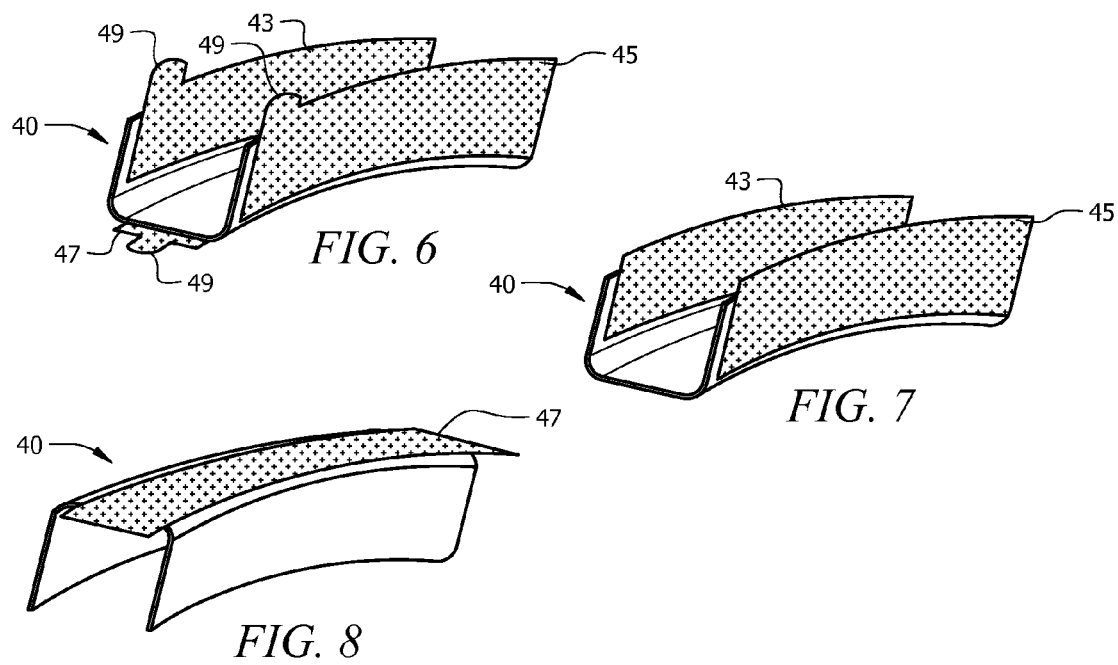
FIG. 6
FIG. 7
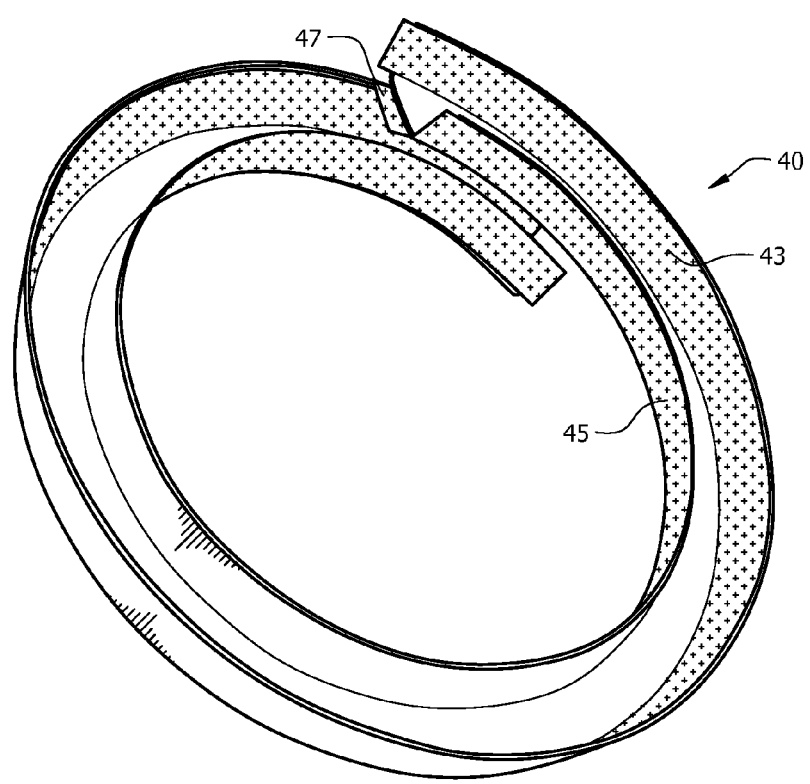
FIG. 8
FIG. 9

METHOD AND APPARATUS HAVING FOUR SURFACES FOR SEALING DISTRIBUTION DUCTS

CROSS-REFERENCE TO RELATED APPLICATION

This application is related to U.S. patent application titled, "Method and Apparatus Having Three Surfaces for Sealing Distribution Ducts," Ser. No. 12/343,382 and U.S. patent application titled, "Method and Apparatus Having Two Surfaces for Sealing Distribution Ducts," Ser. No. 12/343,453 filed even date here within.

FIELD OF THE INVENTION

This invention relates to the field of heating and air conditioning and more particularly to joining heating and air conditioning air distribution ducts.

BACKGROUND

An enormous amount of energy is wasted when cooled air escapes from supply ducts or when hot or cold attic air leaks into return ducts and visa versa. Studies indicate that as much as 30% of the conditioned air in an average central air conditioning system escapes from leaks in these ducts.

For forced air systems to be efficient, ducts must be airtight. A competent professional service technician will take great case in installing or repairing such ducts. Leaky ducts are difficult to find without experience and test equipment.

Even though still in use, the old standard duct tape is inefficient for sealing ducts. To provide a positive seal, current practice includes sealing the duct with "mastic." Mastic is a duct sealant, usually water based and fiber reinforced. It is often provided in buckets or tubes for use in a caulking gun. Even with the use of mastic, tape is still required.

What is needed is an apparatus and application method that will provide a proper seal while reducing installation time of duct work.

SUMMARY OF THE INVENTION

The present invention includes a sealing tape that has a planar bottom, an inner wall and an outer wall. The outer wall has an outward flare. In some embodiments, the sealing tape forms an arc and the surface of the inner wall and the outer wall that is closest to a center point of the arc has an adhesive. In some embodiments, a bottom surface of the bottom also has an adhesive.

In one embodiment, tape for sealing duct work is disclosed. The tape forms an arc with respect to a center point. The tape includes a curved planar outer wall distal from the center point, a bottom and a curved planar inner wall closer to the center point. An outward flare extends from the curved planar outer wall, flaring outwardly away from the center point. The bottom has a bottom surface distal from the curved planar outer wall and the curved planar inner wall. A first adhesive layer is on an inner surface of the curved planar outer wall and the outward flare; a second adhesive layer is on an inner surface of the curved planar inner wall (the surface closest to the center point); and a third adhesive layer is on the bottom surface of the bottom.

In another embodiment, a method of sealing a take-off duct to a collar is disclosed. The collar is installed in a surface of a heating/air-conditioning box/run. The method includes providing a tape, the tape forming an arc with respect to a center point. The tape includes a curved planar outer wall distal from the center point, a planar bottom and a curved planar inner wall closer to the center point. An outward flare extends from the curved planar outer wall extending away from the center point. The planar bottom has a bottom surface distal from the curved planar outer wall and the curved planar inner wall. An edge of the curved planar outer wall is interfaced to a first curved edge of the planar bottom and an edge of the curved planar inner wall is interfaced to an opposite curved edge of the planar bottom; thereby forming a modified U-shaped cross section. A first adhesive layer is on an inner surface of the curved planar outer wall, including the outward flare. A second adhesive layer is on an inner surface of the curved planar inner wall (the surface closest to the center point) and a third adhesive layer is on the bottom surface of the planar bottom. The method continues with pulling the vapor barrier and an insulation layer back from an end of the duct core of the take-off duct and fitting the end of the duct core over the collar. Next, wrapping a band over the end of the duct core and tightening the band. Next, the first adhesive layer is affixed to the circumference of the collar covering at least part of the collar, part of the end of the duct core and the band and the second adhesive layer is affixed to the box/run around the collar. Finally, the insulating layer and the vapor barrier are pushed into the tape between the curved planar inner wall and the curved planar outer wall and the outward flare is bent inward towards the vapor barrier and the third adhesive layer is affixed to the vapor barrier and to an upper surface of the planar bottom.

In another embodiment, a tape for sealing duct work is disclosed. The tape forms an arc with respect to a center point. The tape includes an outer wall distal from the center point, a bottom and an inner wall closer to the center point. The outer wall includes an outward flare. The bottom has a bottom surface distal from both the outer wall and the inner wall. A first edge of the outer wall is interfaced to a first edge of the planar bottom and an edge of the inner wall is interfaced to an opposite edge of the bottom; thereby forming a modified U-shaped cross section. A second edge of the outer wall is interfaced to an edge of the outward flare. In some embodiments, a first adhesive layer is on an inner surface of the outer wall, including the outward flare, a second adhesive layer is on an inner surface of the inner wall (the surface closest to the center point) and a third adhesive layer is on the bottom surface of the bottom.

BRIEF DESCRIPTION OF THE DRAWINGS

The invention can be best understood by those having ordinary skill in the art by reference to the following detailed description when considered in conjunction with the accompanying drawings in which:

FIGS. 2-9 illustrate perspective views of a first embodiment of the present invention.

DETAILED DESCRIPTION

Figure 1A:
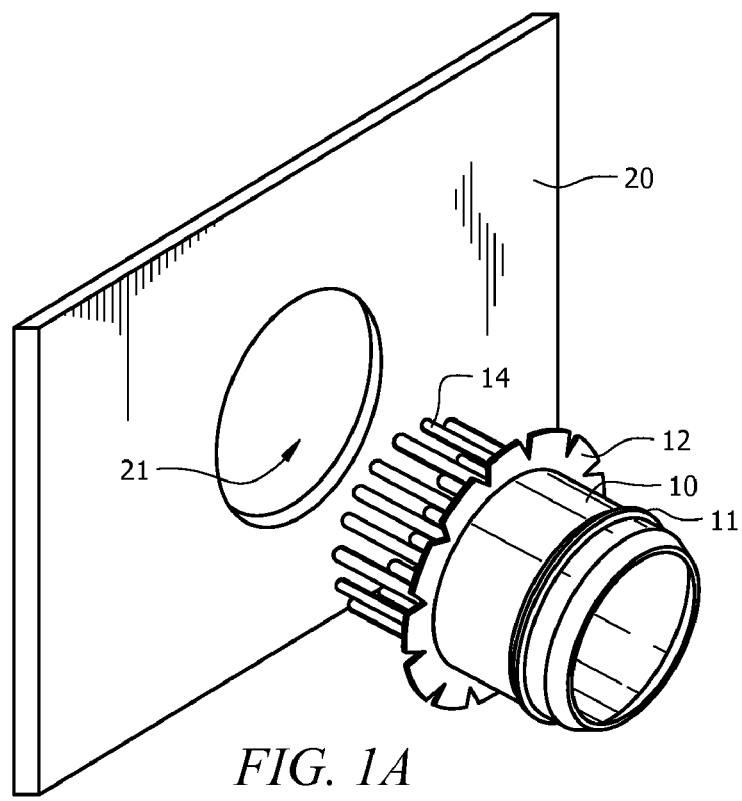
FIGS. 1A-1H illustrate perspective views of adding a duct as done in the prior art.

Reference will now be made in detail to the presently preferred embodiments of the invention, examples of which are illustrated in the accompanying drawings. Throughout the following detailed description, the same reference numerals refer to the same elements in all figures. Throughout this description, the present invention is shown in a typical application of adding a flexible duct or any type of duct to a junction box, run, plenum, trunk, etc, of any geometry. The present invention is anticipated for use with any type of duct, flexible or not, insulated or not, with or without a vapor barrier. For brevity purposes, the following specification uses the term duct or flexible duct to refer to any form of duct or take-off duct as known in the industry.

The present invention is anticipated for use with any type of box, run, plenum, trunk, etc., insulated or not, with or without a vapor barrier. The present invention is anticipated for use with any type of junction or take-off junction. The present invention is also useful in other applications and the examples shown are but several known uses for the present invention. For brevity purposes, the junction box, run, plenum, trunk is hereafter referred to as a box. It is anticipated that the present invention be used with any shape and/or size of duct and any type of box, run, plenum, trunk, etc, with or without insulation and vapor barriers.

Figure 1B:
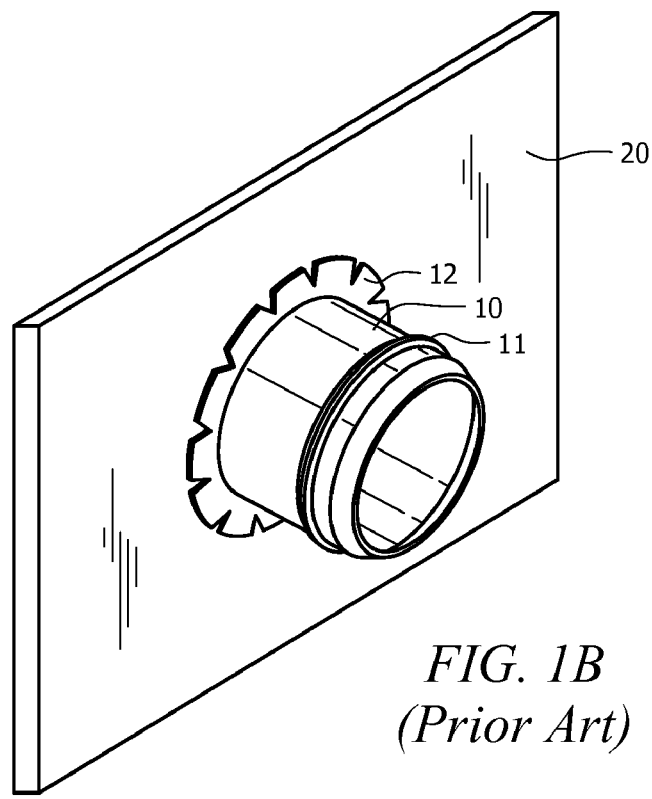
Figure 1C:
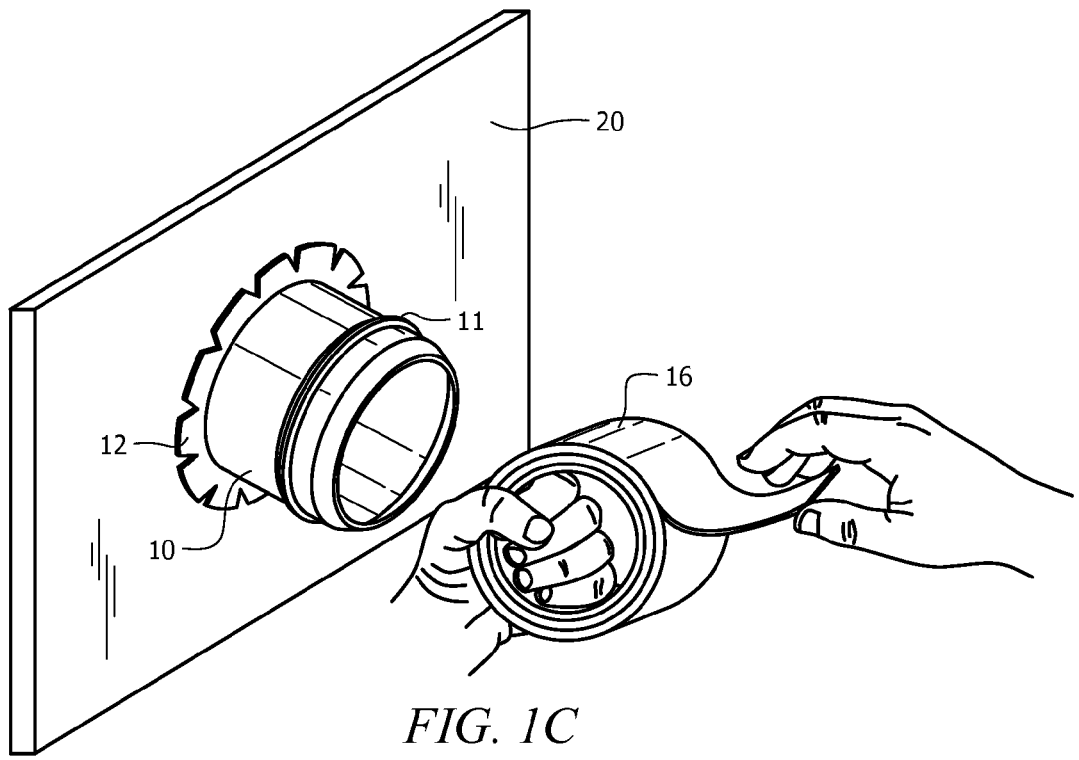
Figure 1D:
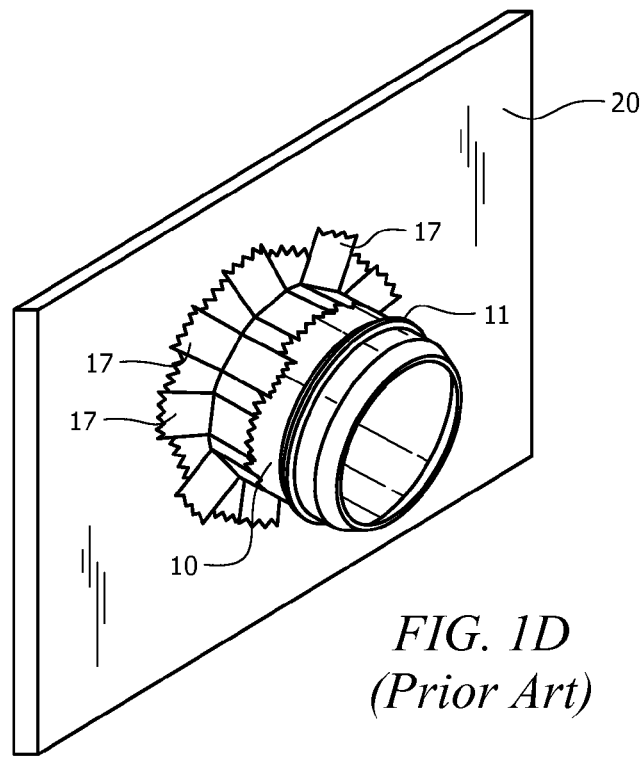

Referring to FIGS. 1A-1H, perspective views of adding a duct as done in the prior art are shown. Ducts are added to a junction box or run 20 by cutting a hole 21 in the box 20 and inserting a collar nipple 10. The collar nipple 10 has dovetail tabs 14 that pass into the hole 21 until the flange 12 butts up against the box 20 and the dovetail tabs 14 are then bent back against the inside wall of the box 20, thereby mechanically attaching the collar nipple 10 to the run/box/plenum/trunk 20. The collar nipple 10 has a collar bead 11 (not visible in this figure) for securing the duct core (see FIG. 1E). FIG. 1B shows the collar nipple 10 physically secured to the box 20. FIG. 1C shows a roll of tape 16 such as duct tape or metal backed tape as used in the prior art. Such tape is well known in the art and is often required to conform to UL® standards. For example, the basic standard used to investigate products related to sealing duct work is ANSI/UL 181A, "Closure Systems for Use with Rigid Air Ducts and Air Connectors," or ANSI/UL 181B, "Closure Systems for Use with Flexible Air Ducts and Air Connectors." One such tape is "3326" pressure sensitive aluminum foil tape from 3M Company. Other such tapes from the Avery Dennison Corporation are "Advantage AD 10", "Advantage AD 80", "Fasson 0810" and "Fasson 0800" pressure sensitive aluminum foil tape for use with rigid glass fiber and flexible (nonmetallic) air ducts (181A-P and 181B-FX). These are examples of the many different types and compositions of tape used to seal air duct systems, and many other types are known. For example, in some applications, the existing tape has no adhesive, called scrim, and a sticky sealant, called mastic, is applied to the joint and the scrim is placed over the mastic and pressed to close gaps, etc. In some installations, the scrim is then brushed with a coat of mastic.

The formed tape of the present invention, as will be shown, is made from the same or similar materials as known in the art. Likewise, the formed tape, as will be explained, is, in some embodiments, backed with the same or similar adhesive materials as the tape of the prior art and in other embodiments, having no an adhesive backing for use with materials such as mastic.

Continuing with the example of the prior art, the tape 16 is torn into small pieces 17 and placed to cover the flange 12, contacting the base of the collar nipple 10 and the wall of the box 20 to provide additional physical support and an air seal between the collar nipple 10 and the box 20. The tape 16 is torn into small pieces 17 so it can interface between a adjacent surface of the box 20 and a round surface of the collar nipple 10. If the pieces are too big, the tape 16 does not mate well with the round surface of the collar nipple 10.

Figure 1E:
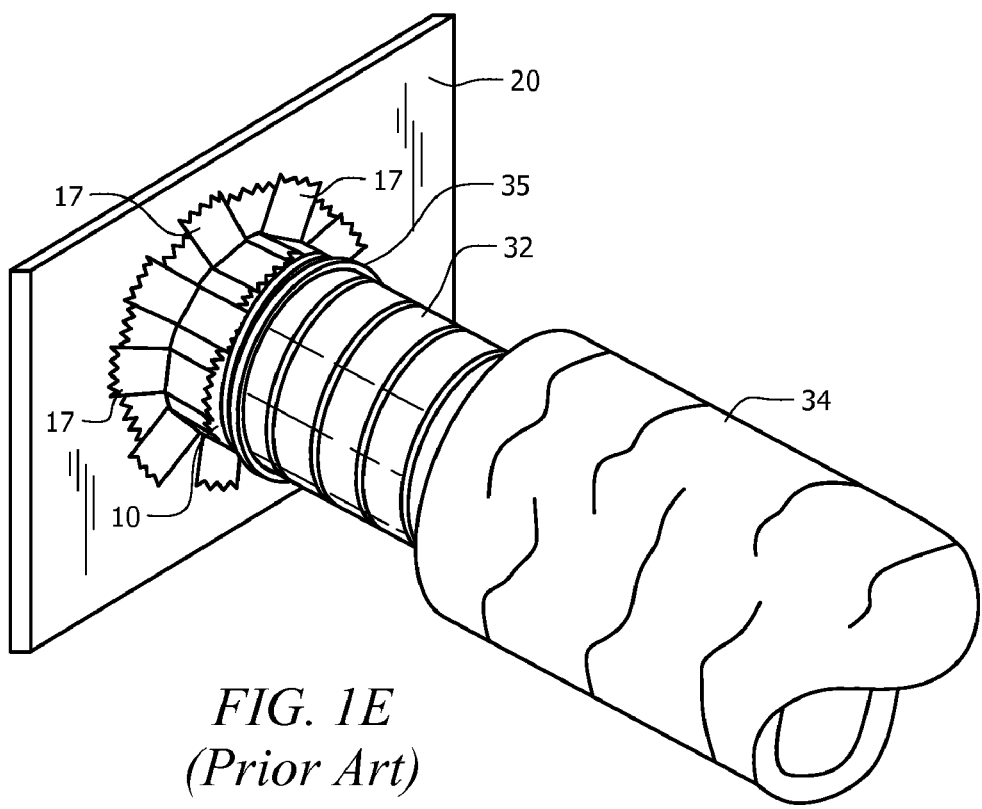
Figure 1F:
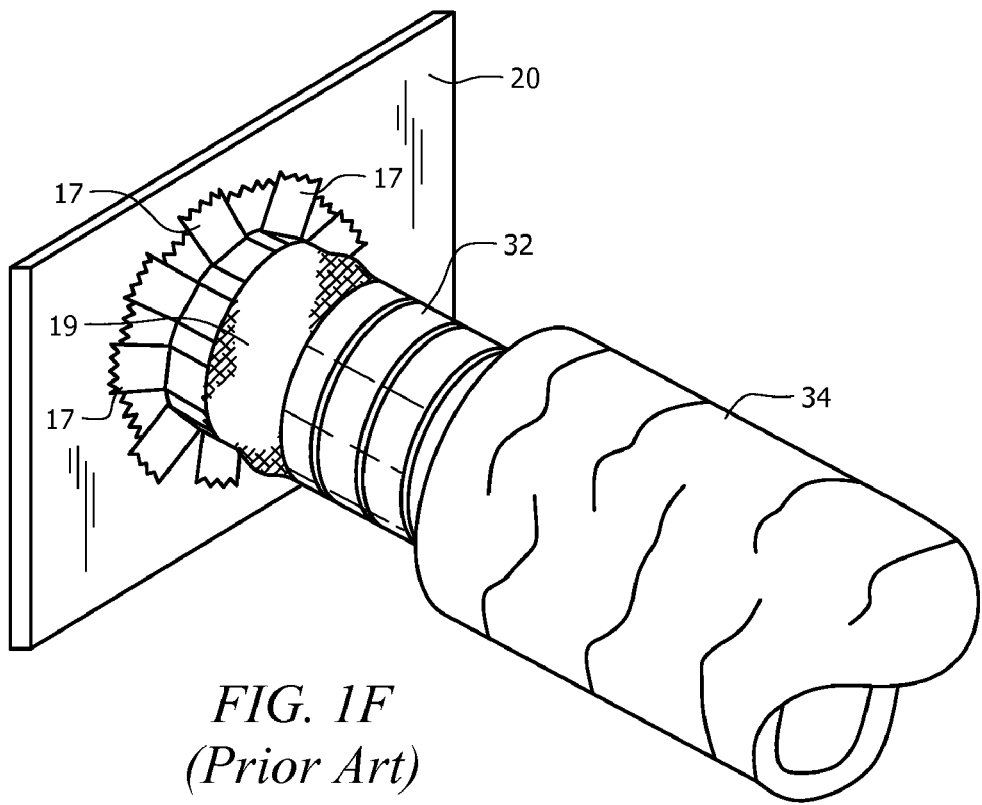

In FIG. 1E, the vapor barrier 34 is pulled back and the flexible air duct 32/34 is positioned so that the duct core 32 is pulled over the collar nipple's 10 bead 11. The duct core 32 is held in place by a band or tie 35 as known in the industry. Next, tape 19 (e.g., duct tape 16 or similar tape) is wrapped around the end of the duct core 32 and the base of the collar nipple 10 to seal that interface (FIG. 1F). In some examples of the prior art, the band/tie 35 is installed after the tape 19 is wrapped.

Figure 1G:
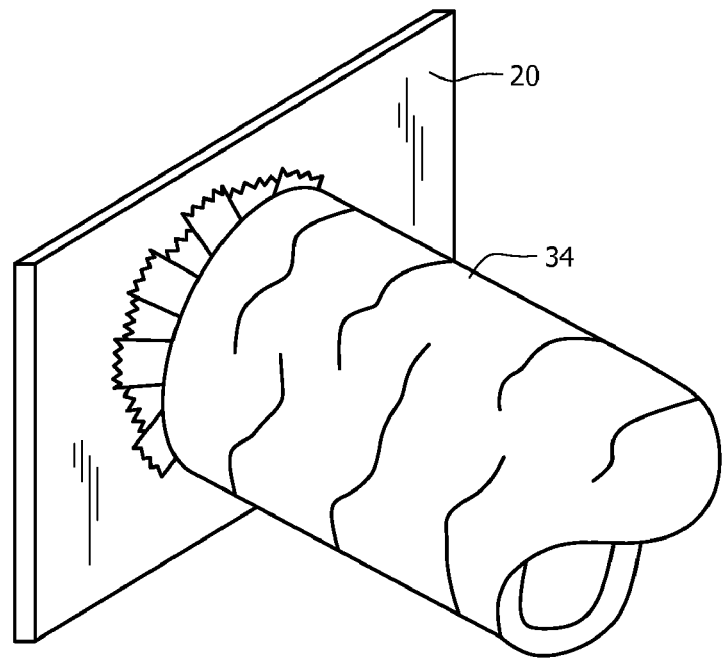
Figure 1H:
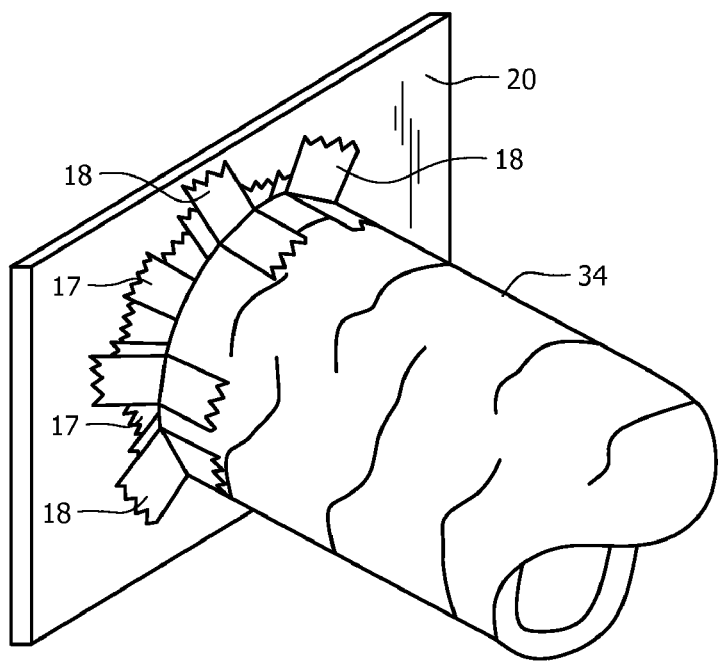

Next, the vapor barrier 34 and insulation 33 (see FIGS. 28-30C) are pulled to cover the flexible duct core 32 and the collar nipple 10 as shown in FIG. 1G then more pieces of torn tape 18 are added on top of the torn pieces of tape 17 (FIG. 1H), providing a vapor barrier seal between the flexible duct vapor barrier 34 and the box 20 or a vapor barrier on the box 20.

Many building codes require multiple passes/layers of tape 17/18/19. As is appreciated by looking at the number of pieces of tape 17/18/19, this step takes much time and requires many pieces of cut or torn tape 17/18/19. Often, building codes, practices, authorities, etc., require double layers of each layers of tape 17/18/19 to assure proper adhesion and a seal. Furthermore, many building codes (etc.) currently require an inspection of the bottom layer of tape 17/19 before adding the top layer of tape 18 to assure the bottom layer of tape 17/19 is to code before it is covered by the top layer of tape 18. Waiting for such an inspection slows down the installation process.

Similar prior art methods are performed using scrim (non-adhesive tape) and mastic sealant.

Referring to FIGS. 2-9, perspective views of a first embodiment of the present invention are shown. To overcome the insufficiencies and inefficiencies of the prior art methods and tape 17/18/19, the present invention includes several embodiments of formed tape. Some embodiments of the formed tape include a curve that permits the formed tape to bond to both the curved surface of the collar nipple 10 and the adjacent surface of the box 20. Some embodiments of the formed tape include ribs, folds, other embossing and the like that permits the formed tape to be bent to interface with the adjacent surface of the box 20 and to be bent around the curved surface of the collar nipple 10. In the embodiments of the formed tape that curve, the formed tape curves outwardly or convexly from a central, imaginary center. In this way, the formed tape wraps around cylindrical objects such as heating and air conditioning collar nipples 10 or the like. It is anticipated that the embodiment of formed tape having ribs, fold, other embossing and the like is useful in, for example, applications in which the take-offs (e.g., collar nipple 10) are of other cross-sectional geometries such as rectangular and hexagonal.

The first embodiment of formed tape 40 is shown in FIGS. 2-9. The U-shaped formed tape 40 has a cross section similar to a flat-bottom-U and is curved. The U-shaped formed tape 40 curve is such that an curved planar inner wall 54 mates evenly with a wide range of cylindrical (or other shaped) collar nipple 10 sizes, overcoming the problems with the flat tape of the prior art. The U-shaped formed tape 40 has a planar bottom 56 that has curved edges, a curved planar inner wall 54 that curves around an imaginary center point and a curved planar outer wall 52 that also curves around the imaginary center point. One edge of the planar bottom 56 is interfaced to a first edge of the curved planar inner wall 54. An opposite edge of the planar bottom 56 is interfaced to an edge of the curved planar outer wall 52. In some embodiments, as shown in FIGS. 2, 4 and 5-8, the interface 59 is rounded. In some embodiments, the interface is a pleat 58 as shown in FIG. 3. In some embodiments, the interface is a right angle (FIG. 9). It is preferred that the bottom 56 and walls 52/54 are formed from a continuous sheet of material.

In some embodiments, the U-shaped formed tape 40 has an adhesive 42 disposed on an inner surface of the curved planar outer wall 52 (the surface closest to the imaginary center point), an adhesive 44 disposed on an inner surface of the curved planar inner wall 54 (the surface closest to the imaginary center point) and an adhesive 46 (not visible) disposed on a bottom surface of the planar bottom 56. In a typical usage scenario, the adhesive 46 on the bottom surface holds the planar bottom 56 against the flange 12 and box 20 connection, the adhesive 44 on the inner surface of the curved planar inner wall 54 holds the curved planar inner wall 54 against the collar nipple 10/duct core 32 and the adhesive 42 on the inner surface of the curved planar outer wall 52 holds the curved planar outer wall 52 to the flexible duct vapor barrier 34. The U-shaped formed tape 40 provides a seal to each of these connections. Although the walls 52/54 are shown roughly perpendicular to the bottom 56, it is anticipated that the walls 52/54 are formed at any angle with respect to the bottom 56. For example, the outer wall 52 is at 110 degrees with respect to the bottom 56 (angled outward) while the inner wall 54 is at 90 degrees with respect to the bottom 56 (perpendicular).

It is anticipated that the U-shaped formed tape 40 is made from any suitable material similar to or the same as tape 16 that is in current use. It is preferred, but not required, that the U-shaped formed tape 40 be made from a pliable, shape-holding material such as an annealed metal typical of materials already in use for duct tapes (e.g., aluminum) to improve retention of the U-shape. In some embodiments, the tape of the present invention has no adhesive layer and is made of materials that, for example, existing scrim is made from such as fiberglass mesh, etc.

It is anticipated that the U-shaped formed tape 40 is manufactured and delivered either in curved sections (e.g., a section sized to fit an 8" collar nipple 10) or on rolls. When implemented in sections, it is preferred, though not required, that the section be approximately 3.14 (Pi) times the diameter of the intended collar nipple 10 plus an overlap. For example, a section for an 8" collar is preferable 28.26"; 25.12" (8"*3.14) plus 3.14" for an overlap. When implemented in rolls, it is anticipated that the U-shaped formed tape 40 be marked every Pi*X interval, where X is a unit of diameter measurement (inches, decimeter, etc.). Therefore, the installer need only count marks representing the diameter of the collar nipple 10 plus one. For example, if the units are inches, the U-shaped formed tape 40 is marked every Pi (~3.14) inches; so for an 8" collar nipple 10, the installer counts 9 marks and cuts the U-shaped formed tape 40. For a 10" collar nipple 10, the installer counts 11 marks and cuts the U-shaped formed tape 40.

To prevent the U-shaped formed tape 40 in embodiments having adhesive surfaces 42/44/46 from unwanted sticking and to facilitate installation, in some embodiments, some or all of the adhesive surfaces 42/44/46 are covered with, for example, removable covers 43/45/47. The removable covers 43/45/47 are, for example, made of a material such as coated paper or plastic that adheres to the adhesive surfaces 42/44/46 and are removed once the U-shaped formed tape 40 is in place for installation. In some embodiments, the removable covers 43/45/47 extend 47 beyond the ends and/or edges of the adhesive 42/44/46 to provide gripping areas, an example of such is shown in FIGS. 5, 7, 8 and 9. In some embodiments, the removable covers 43/45/47 include pull tabs 49 to provide gripping areas as shown in FIG. 6.

Figure 10:
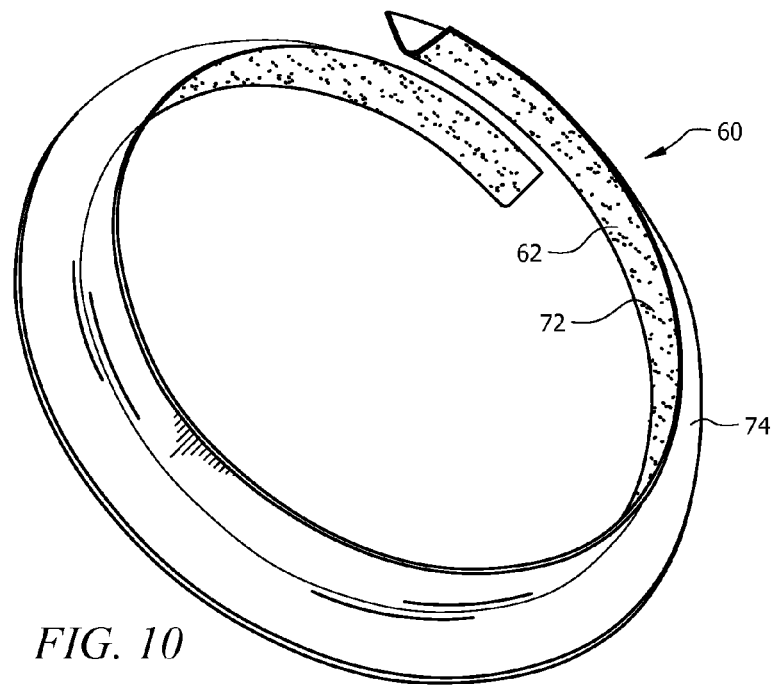
FIGS. 10-14 illustrate perspective views of a second embodiment of the present invention.
Figure 11:
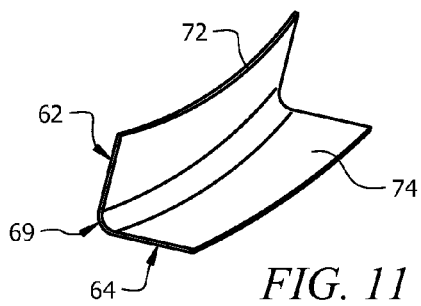
Figure 12:
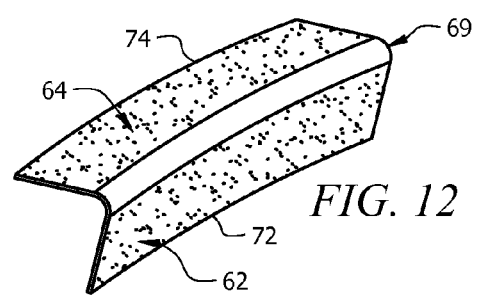
Figure 13:
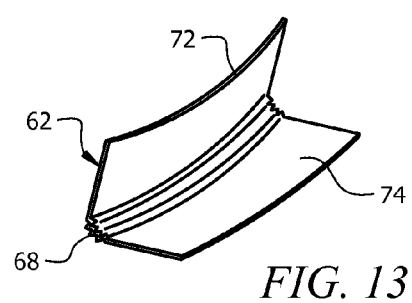
Figure 14:
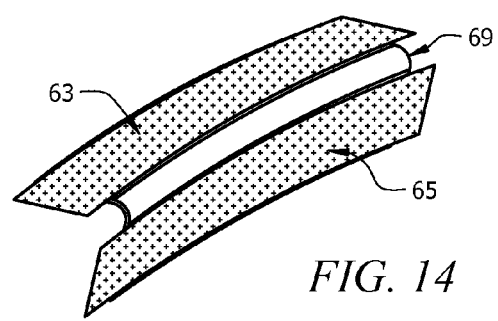

Referring to FIGS. 10-14, perspective views of a second embodiment of the present invention are shown. The second embodiment of L-shaped formed tape 60 is shown in FIGS. 10-14. The L-shaped formed tape 60 has a cross section similar to the letter-L and is curved. The L-shaped formed tape 60 curve is such that the inner planar curved wall 72 mates with a wide range of cylindrical (or other shape) collar nipple 10 sizes, overcoming the problems with the flat tape of the prior art. The L-shaped formed tape 60 has a curved, planar bottom 74 that has edges curved around an imaginary center point and a curved planar inner wall 72. The curved planar inner wall 72 is positioned towards and facing the imaginary center point. One edge of the curved, planar bottom 74 is interfaced to a first edge of the curved planar inner wall 72. In some embodiments, as shown in FIGS. 11, 12 and 14, the interface is rounded 69. In some embodiments, the interface is a pleat 68 as shown in FIG. 13. In some embodiments, the interface is a right angle (FIG. 10). It is preferred that the bottom 74 and curved planar inner wall 72 are formed from a continuous sheet of material. Although the curved planar inner wall 72 is shown roughly perpendicular to the bottom 74, it is anticipated that the inner wall 72 is formed at any angle with respect to the bottom 74. For example, the curved planar inner wall 72 is at 110 degrees with respect to the bottom 74 (angled outward).

In some embodiments, the L-shaped formed tape 60 has an adhesive 62 disposed on an inner surface of the curved planar inner wall 72 and an adhesive 64 disposed on a bottom surface of the planar bottom 74. In a typical installation, the adhesive 64 on the bottom surface 74 holds the planar bottom 74 over the flange 12/box 20 interface and the adhesive 62 on the inner surface of the curved planar inner wall 72 holds the wall 72 against the collar nipple 10/core 32 or to the flexible duct vapor barrier 34 (two loops of the L-shaped formed tape 60 are used, one at the interface of the box 20, flange 12/collar nipple 10/core 32 and the other at the interface of the box 20 and the flexible duct vapor barrier 34). The L-shaped formed tape 60 provides a seal to each of these connections.

It is anticipated that the L-shaped formed tape 60 is made from any suitable material similar to or the same as tape 16 that is in current use. It is preferred, but not required, that the L-shaped formed tape 60 be made from a pliable, shape-holding material such as an annealed metal typical of materials already in use for duct tapes (e.g., aluminum) to improve retention of the L-shape. In some embodiments, the L-shaped formed tape 60 of the present invention has no adhesive layer and is made, for example, of materials that existing scrim is made from such as fiberglass mesh, etc.

It is anticipated that the L-shaped formed tape 60 is manufactured and delivered either in sections (e.g., a section sized to fit an 8" collar nipple 10) or on rolls. When implemented in sections, it is preferred, though not required, that the section be approximately 3.14 (Pi) times the diameter of the intended collar nipple 10 plus an overlap. For example, a section for an 8" collar is preferable 28.26"; 25.12" (8"*3.14) plus 3.14" for an overlap. When implemented in rolls, it is anticipated that the L-shaped formed tape 60 be marked every Pi*X interval, where X is a unit of diameter measurement (inches, decimeter, etc.). Therefore, the installer need only count marks representing the diameter of the collar nipple 10 plus one. For example, if the units are inches, the L-shaped formed tape 60 is marked every Pi (~3.14) inches; so for an 8" collar nipple 10, the installer counts 9 marks and cuts the L-shaped formed tape 60. For a 10" collar nipple 10, the installer counts 11 marks and cuts the L-shaped formed tape 60.

To prevent the L-shaped formed tape 60 of embodiments having adhesive surfaces 62/64 from unwanted sticking and to facilitate installation, it is preferred, but not required, that one or both of the adhesive surfaces 62/64 be covered, for example, with removable covers 63/65. The removable covers 63/65 are, for example, made of a material such as coated paper or plastic that adheres to the adhesive surfaces 62/64 and are removed once the L-shaped formed tape 60 is in place for installation. In some embodiments, the removable covers 63/65 extend beyond the adhesive surfaces 63/65 and/or edges of the planar bottom surface 74 and the curved planar inner wall 72 to provide gripping areas, an example of such is shown in FIG. 14. In some embodiments, the removable covers 63/65 include pull tabs 49 to provide gripping areas as shown in FIG. 6.

Figure 15:
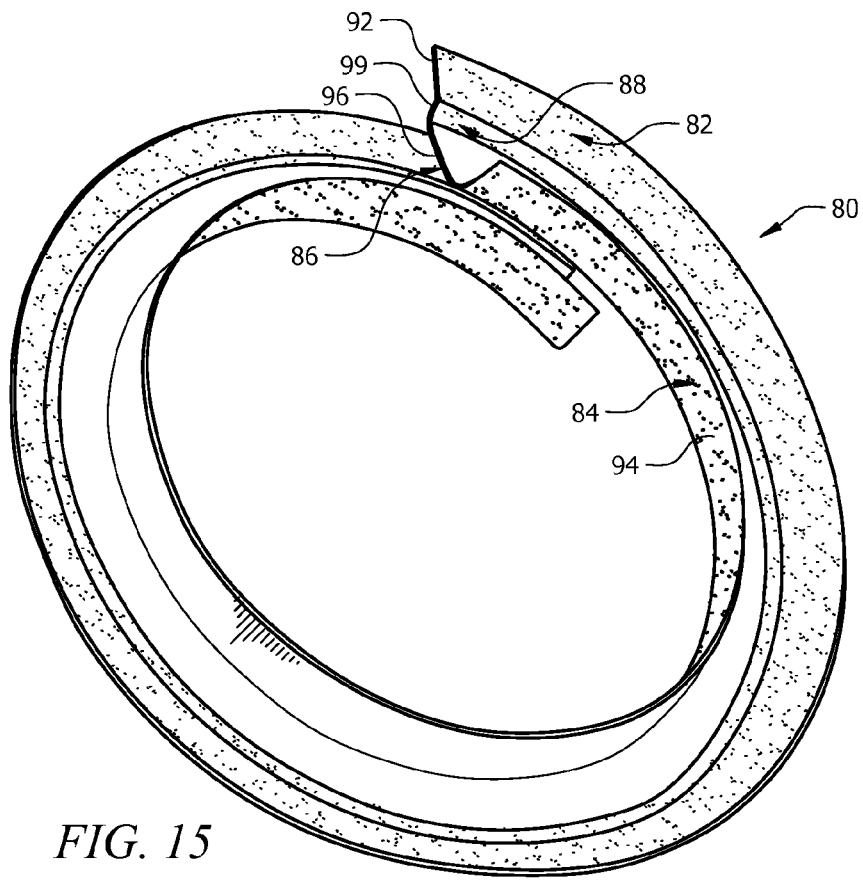
FIGS. 15-17 illustrate perspective views of a third embodiment of the present invention.
Figure 16:
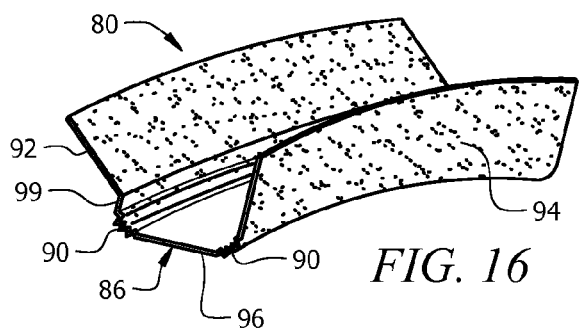
Figure 17:
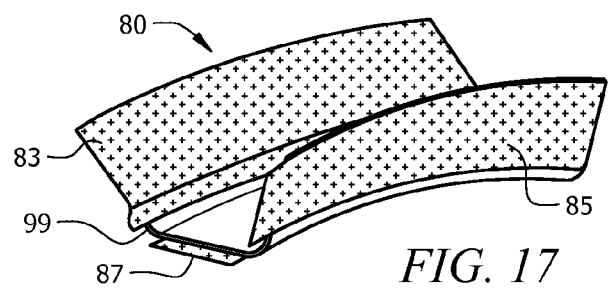

Referring to FIGS. 15-17, perspective views of a third embodiment of the present invention are shown. The third embodiment of formed tape 80 is shown in FIGS. 15-17. The modified U-shaped formed tape 80 has a cross section similar to a flat-bottom-U in which one of the arms of the U is bent outwards and is curved. The modified U-shaped formed tape 80 curve is such that a curved planar inner wall 94 mates with a wide range of cylindrical (or other shaped) collar nipple 10 sizes, overcoming the problems with the tape 16 of the prior art. The modified U-shaped formed tape 80 has a planar bottom 96 that has curved edges, a curved planar inner wall 94 that curves around an imaginary center, a curved outer wall 99 that also curves around the imaginary center and has an outward flare 92 that flares out at any angle between 91 degrees and 180 degrees. One curved edge of the planar bottom 96 is interfaced to a first edge of the curved planar inner wall 94. An opposite curved edge of the planar bottom 96 is interfaced to a first edge of the curved planar outer wall 99 and a second edge of the curved planar outer wall 99 is interfaced with an edge of the outward flare 92. In some embodiments, as shown in FIGS. 15 and 17, the interface is rounded. In some embodiments, the interface is a pleat 90 as shown in FIG. 16. In some embodiments, the interface is a right angle (not shown). It is preferred that the bottom 96, the walls 94/99 and outward flare 92 are formed from a continuous sheet of material.

Although the walls 99/94 are shown interfacing to the bottom at approximately right angles, it is anticipated that the walls 99/94 form at any angle with respect to the bottom 96. For example, the inner wall 94 is at 90 degrees with respect to the bottom 96 and the outer wall 99 is at 100 degrees with respect to the bottom 96 (angled slightly outward). Likewise, it is anticipated that the outward flare 92 be at any angle from 91 to 180 degrees.

In some embodiments, the modified U-shaped formed tape 80 has an adhesive 88 disposed on an inner surface of the outer wall 99; an adhesive 82 disposed on an inner surface of the outward flare 92; an adhesive 84 disposed on the inner surface of the planar inner wall 94 and an adhesive 86 disposed on a bottom surface of the curved planar bottom 96. As will be shown, in a typical use, the adhesive 86 (not visible) on the bottom surface holds the planar bottom 96 over the flange 12/box 20, the adhesive 84 on the inner wall 94 holds the inner wall 94 against the collar nipple 10/duct core 32/band 35, the adhesive 88 on the outer wall 99 holds the outer wall 99 to a top surface of the bottom 96 and the adhesive 82 on the outward flare 92 holds the outward flare 92 to the flexible duct vapor barrier 34. The modified U-shaped formed tape 80 provides a seal to each of these connections.

It is anticipated that the modified U-shaped formed tape 80 is made from any suitable material similar to or the same as tape 16 that is in current use. It is preferred, but not required, that the substrate of the modified U-shaped formed tape 80 be made from a pliable, shape-holding material such as an annealed metal typical of materials already in use for duct tapes (e.g., aluminum) to improve retention of the modified U-shape of the modified U-shaped formed tape 80. In some embodiments, such as those having no adhesive layer, the modified U-shaped formed tape 80 is made, for example, of materials that existing scrim is made from such as fiberglass mesh, etc.

It is anticipated that the modified U-shaped formed tape 80 is manufactured and delivered either in sections (e.g., a section sized to fit an 8" collar nipple 10) or on rolls. When implemented in sections, it is preferred, though not required, that the section be approximately 3.14 (Pi) times the diameter of the intended collar nipple 10 plus an overlap. For example, a section for an 8" collar is preferable 28.26"; 25.12" (8"*3.14) plus 3.14" for an overlap. When implemented in rolls, it is anticipated that the modified U-shaped formed tape 80 be marked every Pi*X interval, where X is a unit of diameter measurement (inches, decimeter, etc.). Therefore, the installer need only count marks representing the diameter of the collar nipple 10 plus one. For example, if the units are inches, the modified U-shaped formed tape 80 is marked every Pi (~3.14) inches; so for an 8" collar nipple 10, the installer counts 9 marks and cuts the modified U-shaped formed tape 80. For a 10" collar nipple 10, the installer counts 11 marks and cuts the modified U-shaped formed tape 80.

To prevent the modified U-shaped formed tape 80 that has adhesive surfaces 82/84/86/88 from unwanted sticking and to facilitate installation, in some embodiments, some or all of the adhesive surfaces 82/84/86/88 are covered, for example, with removable covers 83/85/87. The removable covers 83/85/87 are, for example, made of a material such as coated paper or plastic that adheres to the adhesive surfaces 82/84/86/88 and are removed once the modified U-shaped tape 80 is in place for installation. In some embodiments, the removable covers 83/85/87 extend beyond the ends and/or edges of the planar bottom surface 96 and the wall 94/outward flare 92 to provide gripping areas, an example of such is shown in FIG.

17. In some embodiments, the removable covers 83/85/87 include pull tabs 49 to provide gripping areas as shown in FIG. 6.

Figure 18:
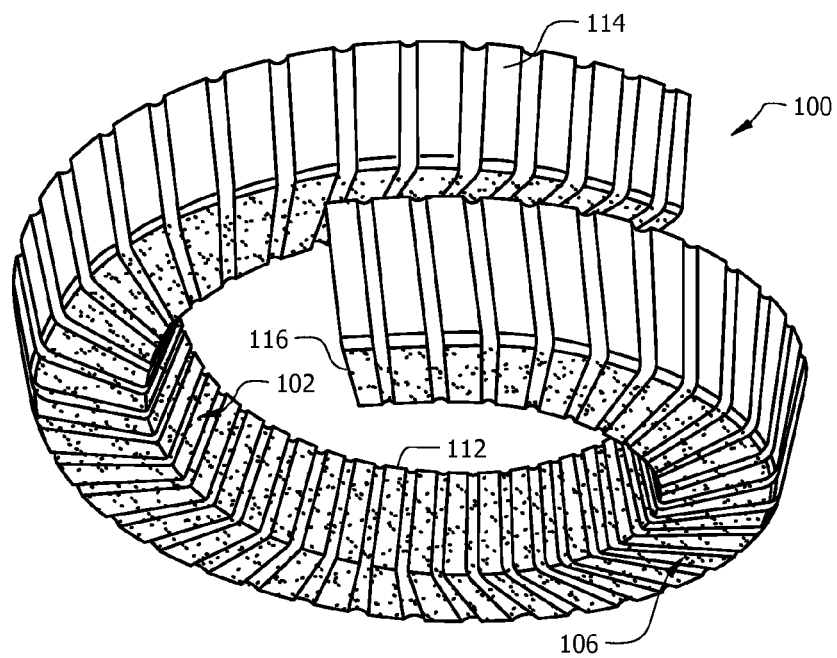
FIGS. 18-20 illustrate perspective views of a modified first embodiment of the present invention.
Figure 19:
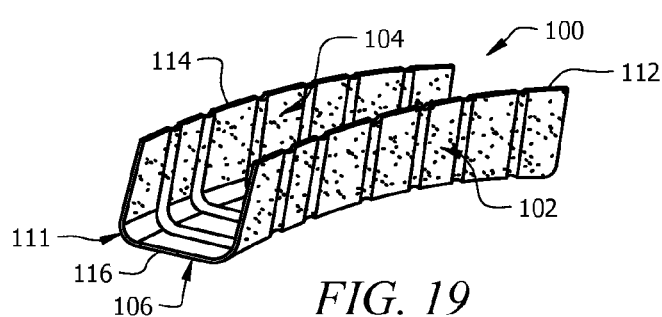
Figure 20:
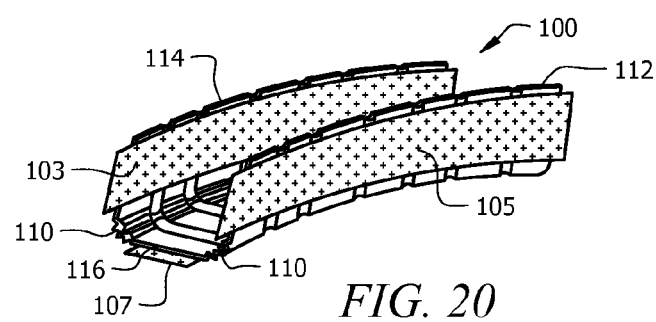

Referring to FIGS. 18-20, perspective views of a modified first embodiment of the present invention are shown. The modified first embodiment of formed tape 100 is shown in FIGS. 18-20. The modified first embodiment of formed tape 100 has a cross section similar to a flat-bottom-U. Since the modified first embodiment of formed tape 100 is bent to wrap around many different shaped objects, the modified first embodiment of formed tape 100 is provided in either curved sections/rolls and/or in sections that are not curved (e.g., straight sections).

When curved, the modified first embodiment of formed tape 100 curve is such that its inner wall 112 mates with a wide range of cylindrical (or other shape) collar nipple 10 sizes. The modified first embodiment of formed tape 100 has ribs, folds, bends or embosses across one or its entire planar bottom 116, inner wall 112 and outer wall 114. The ribs, folds, embosses or bends facilitate installation, allowing the modified first embodiment of formed tape 100 to stretch, bend, compress and/or adjust to a range of object sizes, irregular surfaces and various object shapes such as rectangular or octagonal ducts. It is anticipated that the folds, ribs, embosses or bends are at any frequency and/or quantity along the surfaces 112/114/116. For example, in one embodiment, there are five folds spaced apart every three inches on the planar bottom 116 and no folds in the walls 112/114.

One edge of the bottom 116 is interfaced to a first edge of the inner wall 112. An opposite edge of the bottom 116 is interfaced to an edge of the outer wall 114. In some embodiments, as shown in FIGS. 18 and 19, the interface 111 is rounded. In some embodiments, the interface is a pleat 110 as shown in FIG. 20. In some embodiments, the interface is a right angle (not shown). It is preferred that the bottom 116 and walls 112/114 are formed from a continuous sheet of material. Although the walls 112/114 are shown roughly perpendicular to the bottom 116, it is anticipated that the walls 112/114 meet the bottom 116 at any angle. For example, the inner wall 112 is at 90 degrees with respect to the bottom 116 and the outer wall 114 is at 110 degrees with respect to the bottom 116 (angled outward).

In some embodiments, the modified first embodiment of formed tape 100 has an adhesive 104 disposed on an inner surface of the outer wall 114 (the surface closest to a reference point), an adhesive 102 disposed on an inner surface of the inner wall 112 (the surface closest to the same reference point) and an adhesive 106 disposed on a bottom surface of the functionally planar bottom 116. In a typical application, the adhesive 106 on the bottom surface holds the bottom 116 to the flange 12/box 20, the adhesive 102 on the inner surface of the inner wall 112 holds the inner wall 112 against the collar nipple 10/flexible duct's core 32/band 35 and the adhesive 104 on the inner surface of the outer wall 114 holds the outer wall 114 to the flexible duct vapor barrier 34. The modified first embodiment of formed tape 100 provides a seal to each of these connections.

It is anticipated that the modified first embodiment of formed tape 100 is made from any suitable material similar to or the same as the prior art tape 16. It is preferred, but not required, that the substrate of the modified first embodiment of formed tape 100 be made from a pliable, shape-holding material such as an annealed metal typical of materials already in use for duct tapes (e.g., aluminum) to improve retention of the U-shape and ribs folds, embosses or bends. In some embodiments, the modified first embodiment of formed tape 100 has no adhesive layer and is made, for example, of materials such as those used to make scrim such as fiberglass mesh, etc.

It is anticipated that the modified first embodiment of formed tape 100 is manufactured and delivered either in sections (e.g., a section sized to fit an 8" collar nipple 10) or on rolls. When implemented in sections, the sections are either provided as curved sections or non-curved sections (e.g., straight sections), since the modified first embodiment of formed tape 100 is bent to fit the target application. When implemented in curved or non-curved sections, it is preferred, though not required, that the section be approximately 3.14 (Pi) times the diameter of the intended collar nipple 10 plus an overlap. For example, a section for an 8" collar is preferable 28.26"; 25.12" (8"*3.14) plus 3.14" for an overlap. When implemented in rolls, it is anticipated that the modified first embodiment of formed tape 100 be marked every Pi*X interval, where X is a unit of diameter measurement (inches, decimeter, etc.). Therefore, the installer need only count marks representing the diameter of the collar nipple 10 plus one. For example, if the units are inches, the modified first embodiment of formed tape 100 is marked every Pi (~3.14) inches; so for an 8" collar nipple 10, the installer counts 9 marks and cuts the modified first embodiment of formed tape 100. For a 10" collar nipple 10, the installer counts 11 marks and cuts the modified first embodiment of formed tape 100.

To prevent the modified first embodiment of formed tape 100 having adhesive surfaces 102/104/106 from unwanted sticking and to facilitate installation, in some embodiments, one or more of the adhesive surfaces 102/104/106 are covered, for example, with removable covers 103/105/107. The removable covers 103/105/107 are, for example, made of a material such as coated paper material or plastic that adheres to the adhesive surfaces 102/104/106 and are removed, for example, when the modified first embodiment of formed tape 100 is in place for installation. In some embodiments, the removable covers 103/105/107 extend beyond the ends and/or edges of the adhesive surfaces 102/104/106 to provide gripping areas, an example of such is shown in FIG. 20. In some embodiments, the removable covers 103/105/107 include pull tabs 49 to provide gripping areas an example of such is shown in FIG. 6.

Figure 21:
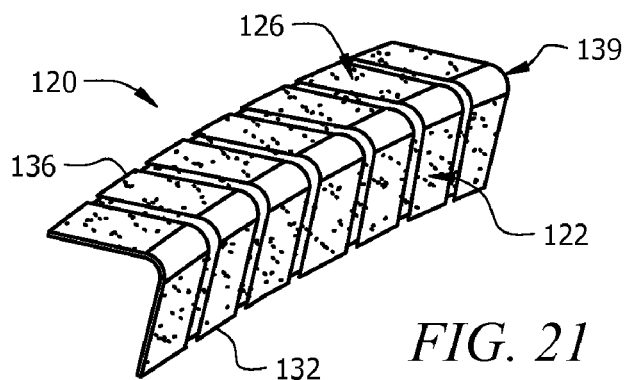
FIGS. 21-23 illustrate perspective views of a modified second embodiment of the present invention.
Figure 22:
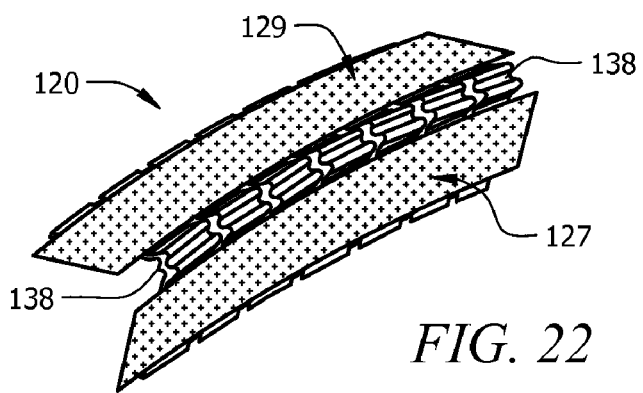
Figure 23:
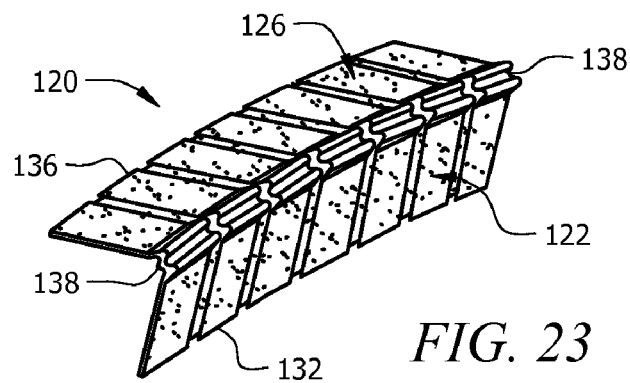

Referring to FIGS. 21-23, perspective views of a modified second embodiment of the present invention are shown. The modified second embodiment of formed tape 120 is shown in FIGS. 21-23. The modified second embodiment of formed tape 120 has a cross section similar to the letter-L. Since the modified second embodiment of formed tape 120 is bent to wrap around many different shaped objects, the modified second embodiment of formed tape 120 is provided in either curved sections/rolls and/or in sections that are not curved (e.g., straight sections) since the modified second embodiment of formed tape 120 is bent to fit the target application.

When curved, the modified second embodiment of formed tape 120 curve is such that its curved inner wall 132 mates with a wide range of cylindrical (or other shape) collar nipple 10 sizes.

The modified second embodiment of formed tape 120 has a bottom surface 136 and an inner wall 132. One edge of the bottom 136 is interfaced to a first edge of the inner wall 132. In some embodiments, as shown in FIG. 21, the interface 139 is rounded. In some embodiments, the interface is a pleat 138 as shown in FIGS. 22 and 23. In some embodiments, the interface is a right angle (not shown). It is preferred that the bottom 136 and inner wall 132 are formed from a continuous sheet of material. Although the inner wall 132 is shown roughly perpendicular to the bottom 136, it is anticipated that the inner wall 132 is formed at any angle with respect to the bottom 136. For example, the inner wall 132 is at 120 degrees with respect to the bottom 136 (angled outward). The modified second embodiment of formed tape 120 has ribs, folds, bends or other embossing across one or both of its surfaces 132/136. The ribs, folds, embosses or bends to facilitate installation, allowing the modified second embodiment of formed tape 120 to stretch, bend, compress and/or adjust to irregular surfaces. It is anticipated that the ribs, embosses, folds or bends are at any frequency and/or quantity along the surfaces 132/136. For example, in one embodiment, there are five embosses spaced apart every three inches on the bottom surface 136 and no folds in the inner wall 132.

In some embodiments, the modified second embodiment of formed tape 120 has an adhesive 122 disposed on an inner surface of the inner wall 132 and an adhesive 126 disposed on a bottom surface of the bottom 136. It is anticipated that either of both of the adhesive coatings 122/126 be present. In a typical use, the adhesive 126 on the bottom surface 136 holds the bottom surface 136 over the flange 12/box 20 and the adhesive 122 on the inner surface of the inner wall 132 holds the inner wall 132 against the collar nipple 10/duct core 32 or to the duct vapor barrier 34 (two loops of the modified second embodiment of formed tape 120 are used, one at the interface of the box 20/flange 12/collar nipple 10/duct core 32 and the other at the interface of the box 20 and the vapor barrier 34). The modified second embodiment of formed tape 120 provides a seal to each of these connections.

It is anticipated that the substrate of the modified second embodiment of formed tape 120 be made from any suitable material similar to or the same as tape 16 that is in current use. It is preferred, but not required, that the substrate of the modified second embodiment of formed tape 120 be made from a pliable, shape-holding material such as an annealed metal typical of materials already in use for duct tapes (e.g., aluminum) to improve retention of the L-shape and the ribs, etc. In some embodiments, the modified second embodiment of formed tape 120 has no adhesive and is made, for example, of materials such as those used in scrim such as fiberglass mesh.

It is anticipated that the modified second embodiment of formed tape 120 is manufactured and delivered either in sections (e.g., a section sized to fit an 8" collar nipple 10) or on rolls. When implemented in sections, the sections are either curved or not curved (e.g., straight) and are bent to match the application. When implemented in sections, it is preferred, though not required, that the section be approximately 3.14 (Pi) times the diameter of the intended collar nipple 10 plus an overlap. For example, a section for an 8" collar is preferable 28.26"; 25.12" (8"*3.14) plus 3.14" for an overlap. When implemented in rolls, it is anticipated that the modified second embodiment of formed tape 120 be marked every Pi*X interval, where X is a unit of diameter measurement (inches, decimeter, etc.). Therefore, the installer need only count marks representing the diameter of the collar nipple 10 plus one. For example, if the units are inches, the modified second embodiment of formed tape 120 is marked every Pi (~3.14) inches; so for an 8" collar nipple 10, the installer counts 9 marks and cuts the modified second embodiment of formed tape 120. For a 10" collar nipple 10, the installer counts 11 marks and cuts the modified second embodiment of formed tape 120.

In embodiments with adhesive layers 122/126, to prevent the modified second embodiment of formed tape 120 from unwanted sticking and to facilitate installation, it is preferred that one or both of the adhesive surfaces 122/126 be covered with removable covers 127/129. The removable covers 127/129 are, for example, made of a material such as coated paper or plastic that adheres to the adhesive surfaces 122/126 and are removable (e.g., once the modified second embodiment of formed tape 120 is in place for installation). In some embodiments, the removable covers 127/129 extend beyond the ends and/or edges of the bottom surface 136 and the wall 132 to provide gripping areas, an example of such is shown in FIG. 22. In some embodiments, the removable covers 127/129 include pull tabs 49 to provide gripping areas as shown in FIG. 6.

Figure 24:
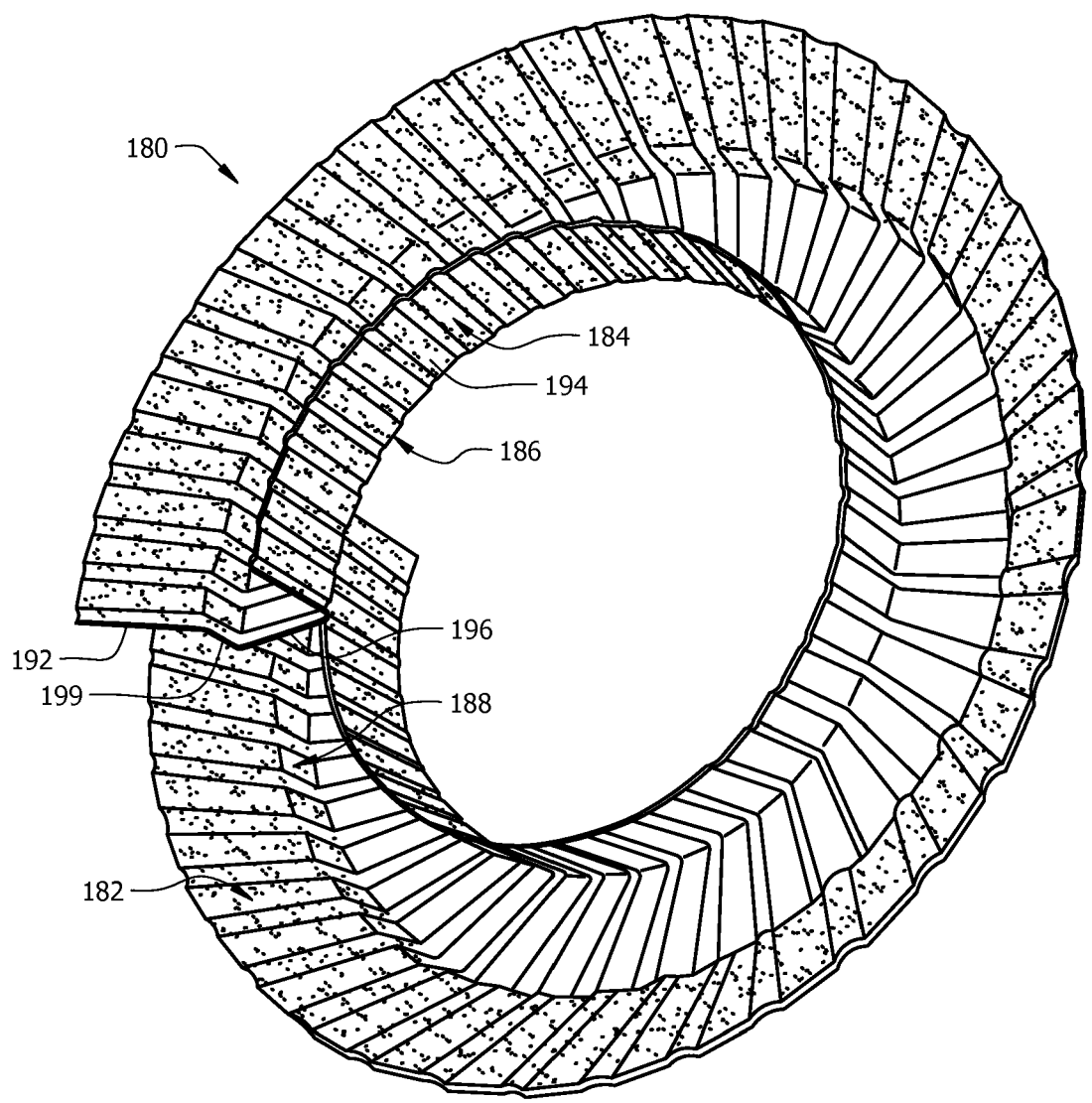
FIG. 24 illustrates a perspective view of a modified third embodiment of the present invention.

Referring to FIG. 24, a perspective view of a modified third embodiment of the present invention is shown. The modified third embodiment of formed tape 180 is shown in FIG. 24. The modified U-shaped formed tape 180 has a cross section similar to a flat-bottom-U in which one of the arms of the U is bent outwards and is curved. Since the modified third embodiment of formed tape 180 is bent to wrap around many different shaped objects, the modified third embodiment of formed tape 180 is provided in either curved sections/rolls and/or in sections that are not curved (e.g., straight sections).

When curved, the modified third embodiment of formed tape 180 curve is such that its inner wall 194 mates with a wide range of cylindrical (or other shape) collar nipple 10 sizes. The modified third embodiment of formed tape 180 has ribs, folds, embosses or bends across one or all of its planar bottom surface 196, inner wall 194, outer wall 199 and outward flare 192. The ribs, folds embosses or bends facilitate effective installation, allowing the modified third embodiment of formed tape 180 to stretch, bend, compress and/or adjust to a range of object sizes, irregular surfaces and various object shapes such as rectangular or octagonal ducts. It is anticipated that the ribs, folds, embosses or bends are at any frequency and/or quantity along the surfaces 192/194/196/199. For example, in one embodiment, there are five embosses spaced apart every three inches on the bottom surface 196 and no folds in the walls 199/194 or outward flare 192.

The modified U-shaped formed tape 180 has a bottom surface 196, an inner wall 194 and an outer wall 199 that has an outward flare 192. One edge of the bottom 196 is interfaced to a first edge of the inner wall 194. An opposite edge of the bottom 196 is interfaced to a first edge of the outer wall 199 and a second edge of the outer wall 199 is interfaced to an edge of the outward flare 192. In some embodiments, similar to that shown in FIG. 17, the interface is rounded. In some embodiments, the interface is a pleat similar to the pleat 90 shown in FIG. 16. In some embodiments, the interface is a right angle as shown if FIG. 24. It is preferred that the bottom 196, walls 194/199 and outward flare 192 are formed from a continuous sheet of material. Although the walls 192/199 are shown meeting the bottom at approximately right angles, it is anticipated that the walls 192/199 meet at any angle with respect to the bottom 196. For example, the inner wall 194 is at 90 degrees with respect to the bottom 196 and the outer wall 199 is at 100 degrees with respect to the bottom 196 (angled slightly outward). The modified third embodiment of formed tape 180 has ribs, folds, bends or other embossing across one or more of its surfaces 192/194/196/199. The folds or bends to facilitate installation, allowing the modified third embodiment of formed tape 180 to stretch, bend, compress and/or adjust to irregular surfaces. It is anticipated that the folds or bends are at any frequency and/or quantity along the surfaces 192/194/196/199. For example, in one embodiment, there are five embosses spaced apart every three inches on the bottom surface 196 and no embosses in the walls 194/199 and no embosses in the outward flare 192.

In some embodiments, the modified U-shaped formed tape 180 has an adhesive 182 disposed on an inner surface of the outward flared 192, an adhesive 188 disposed on an inner surface of the outer wall 199, an adhesive 184 disposed on an inner surface of the inner wall 194 and an adhesive 186 (not visible) disposed on a bottom surface of the bottom 196. In a typical application, the adhesive 186 on the bottom surface holds the planar bottom 196 over the flange 12/box 20, the adhesive 184 on the inner surface of the inner wall 194 holds the inner wall 194 to the collar nipple 10 and duct core 32, the adhesive 188 on the inner surface of the outer wall 199 holds the outer wall 199 to the top surface of the bottom 196 and the adhesive 182 on the inner surface of the outward flare 192 holds the outward flare 192 to the flexible duct vapor barrier 34. The modified U-shaped formed tape 180 provides a seal to each of these connections.

It is anticipated that the substrate of the modified U-shaped formed tape 180 is made from any suitable material similar to or the same as tape 16 that is in current use. It is preferred, but not required, that the substrate of the modified U-shaped formed tape 180 be made from a pliable, shape-holding material such as an annealed metal typical of materials already in use for duct tapes (e.g., aluminum) to improve retention of the modified U-shape of the modified U-shaped formed tape 180. In some embodiments, the modified U-shaped formed tape 180 has no adhesive 182/184/186/188 and is made, for example, of materials similar to materials used for scrim such as fiberglass mesh, etc.

It is anticipated that the modified U-shaped formed tape 180 is manufactured and delivered either in sections (e.g., a section sized to fit an 8" collar nipple 10) or on rolls. When implemented in sections, the sections are either curved or not curved (e.g., straight). When implemented in sections, it is preferred, though not required, that the section be approximately 3.14 (Pi) times the diameter of the intended collar nipple 10 plus an overlap. For example, a section for an 8" collar is preferable 28.26"; 25.12" (8"*3.14) plus 3.14" for an overlap. When implemented in rolls, it is anticipated that the modified U-shaped formed tape 180 be marked every Pi*X interval, where X is a unit of diameter measurement (inches, decimeter, etc.). Therefore, the installer need only count marks representing the diameter of the collar nipple 10 plus one. For example, if the units are inches, the modified U-shaped formed tape 180 is marked every Pi (~3.14) inches; so for an 8" collar nipple 10, the installer counts 9 marks and cuts the modified U-shaped formed tape 180. For a 10" collar nipple 10, the installer counts 11 marks and cuts the modified U-shaped formed tape 180.

To prevent the modified U-shaped formed tape 180 of those embodiments having adhesive surfaces 182/184/186/188 from unwanted sticking and to facilitate installation, it is preferred that some or all of the adhesive surfaces 182/184/186/188 be covered with, for example, removable covers similar to the removable covers 83/85/87 an example of such is shown in FIG. 17. It should be noted that in some embodiments, one, two, three or four surfaces have adhesives.

Figure 25:
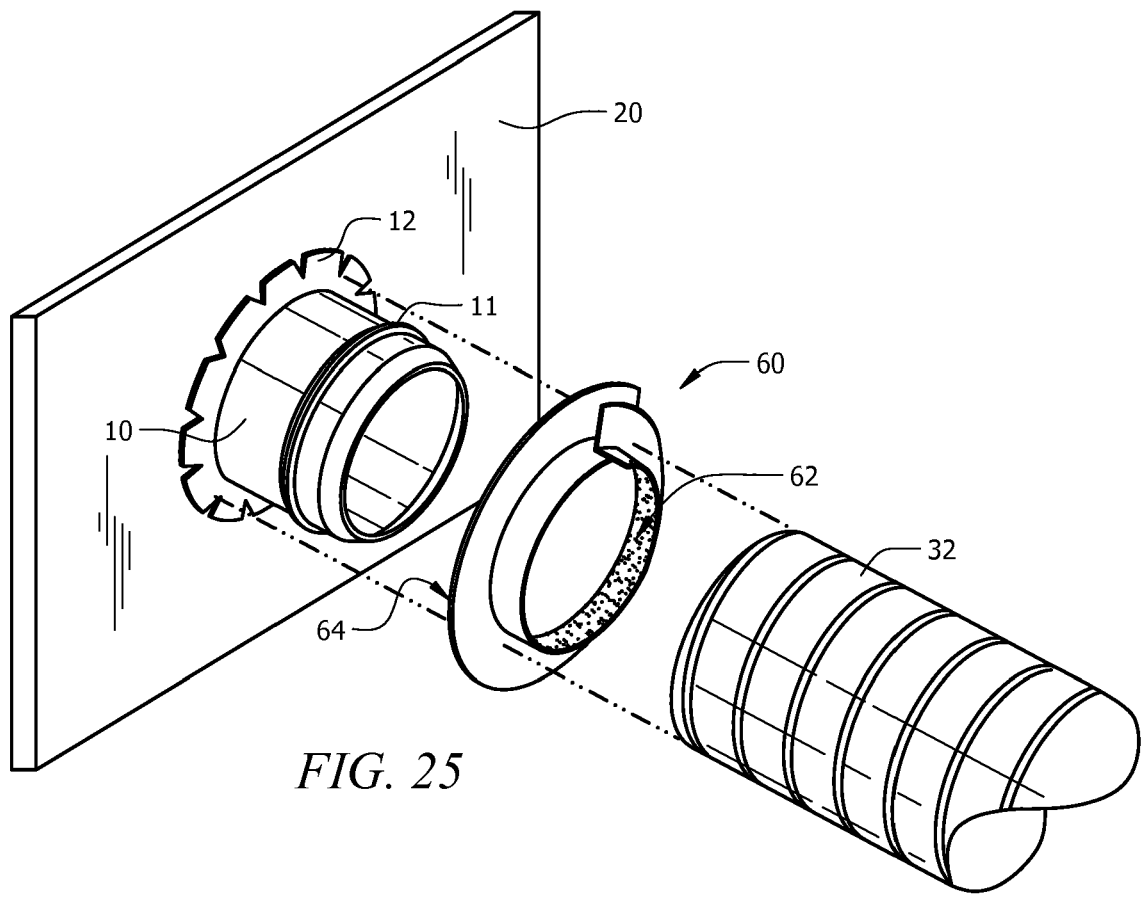
FIG. 25 illustrates a perspective view of the second embodiment of the present invention applied to a duct installation.

Referring to FIG. 25, a perspective view of the second embodiment of the present invention applied to a duct installation is shown. In this, the L-shaped formed tape 60 is applied so that the adhesive 64 (not visible) on the bottom 74 (see FIGS. 10-13) covers and adheres to the joint between the box 20 and the flange 12 of the collar nipple 10, thereby forming a seal over that joint. The adhesive 62 on the inner wall 72 adheres to the collar nipple 10 and duct core 32. As is shown in FIG. 28, another section of the L-shaped formed tape 60 is used to hold and seal the vapor barrier 34.

Figure 26A:
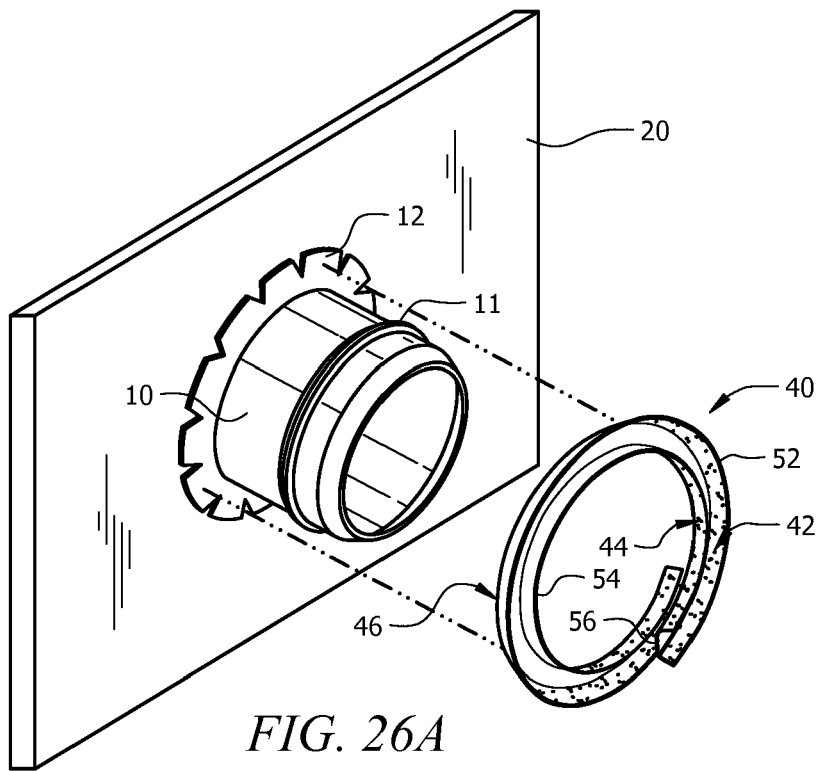
FIGS. 26A-B illustrate perspective views of the first embodiment of the present invention applied to a duct installation.
Figure 26B:
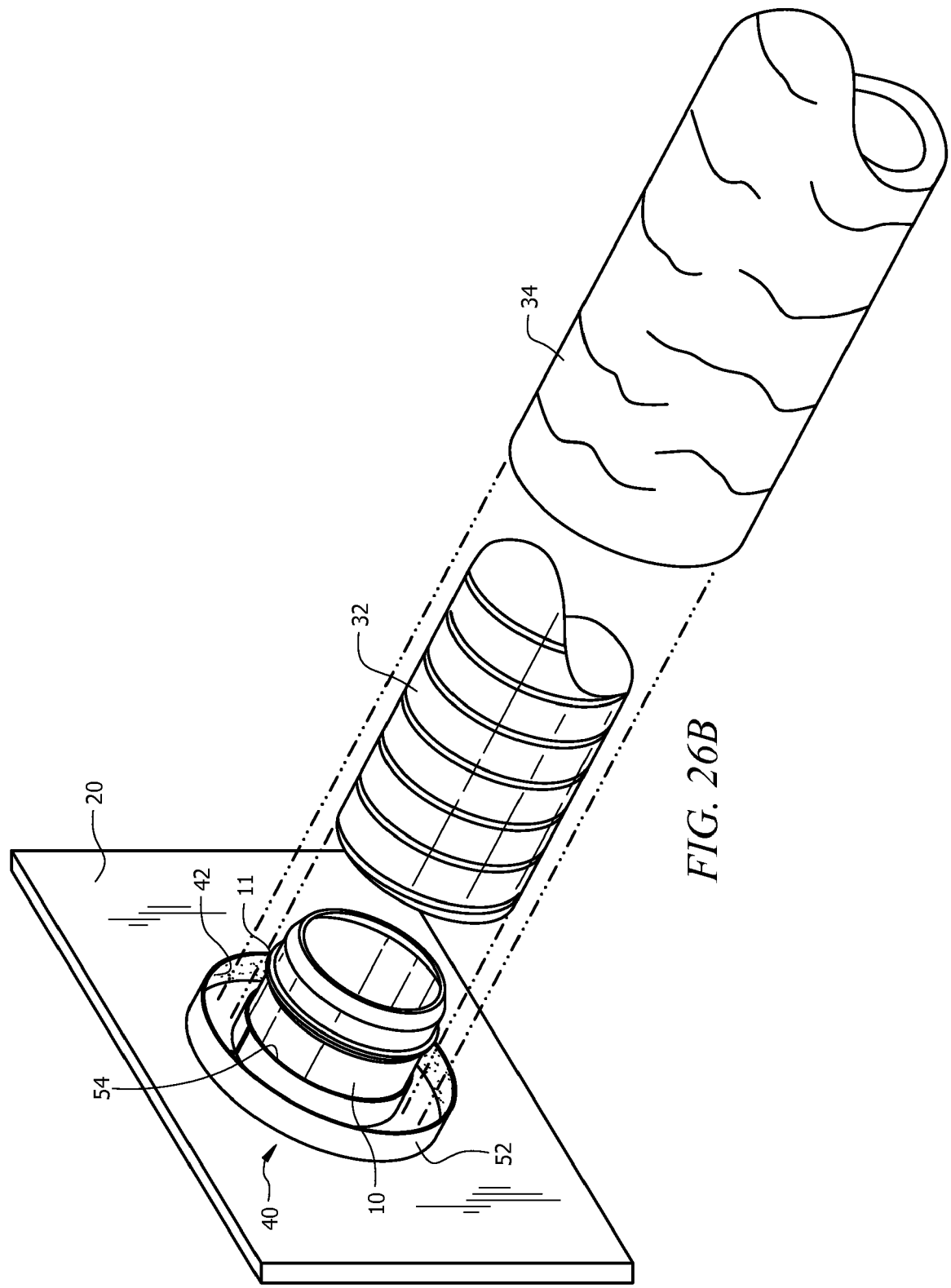

Referring to FIGS. 26A-B, perspective views of the first embodiment of the present invention applied to a duct installation are shown. In this, the U-shaped formed tape 40 is applied so that the adhesive 46 (not visible) on the bottom 56 covers and adheres to the joint between the box 20 and the flange 12 of the collar nipple 10, thereby forming a seal over the joint. The adhesive 44 on the inner wall 54 adheres to the collar nipple 10 and duct core 32. As shown in FIG. 26B, the insulation 33 and vapor barrier 34 is pushed into the U-shaped formed tape 40 and the vapor barrier 34 adheres to the adhesive 42 on the inside surface of the outer wall 52. It is advantageous to have the cover 43 over the adhesive 42 to facilitate insertion of the insulation 33 and vapor barrier 34. After the insulation 33 and vapor barrier 34 are inserted, the cover 43 is removed to allow the adhesive 42 to contact the outer surface of the vapor barrier 34.

Figure 27:
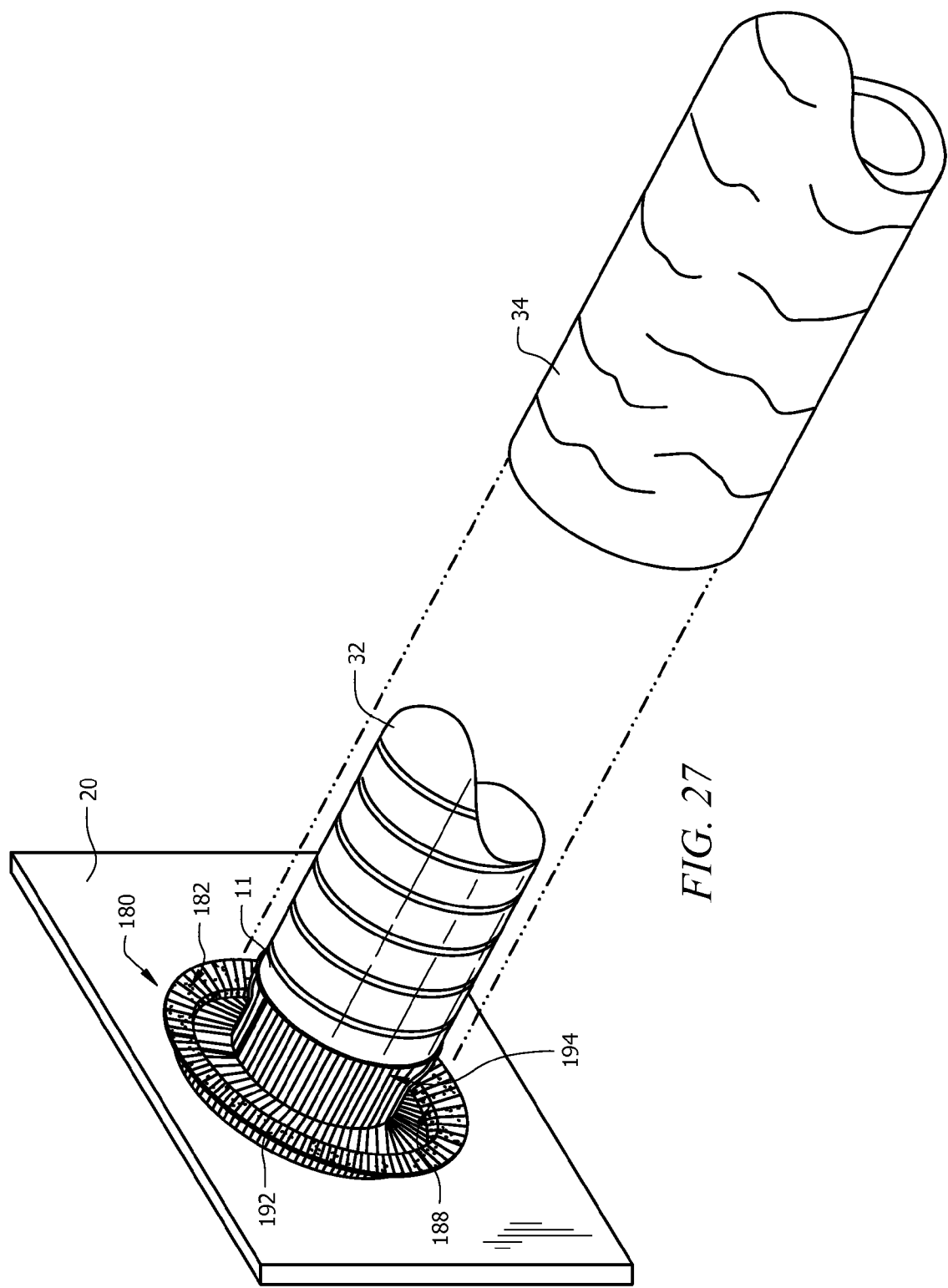
FIG. 27 illustrates a perspective view of the modified third embodiment of the present invention applied to a duct installation.

Referring to FIG. 27, a perspective view of the modified third embodiment of the present invention applied to a duct installation is shown. In this, the modified U-shaped formed tape 180 is depicted with the adhesive 186 (not visible) holding the bottom surface of the bottom 196 (not visible) over the joint between the box 20 and the flange 12 of the collar nipple 10 and the adhesive 184 (not visible) holding the inner wall 194 to the collar nipple 10 and duct core 32. The duct core 32 is installed on the collar nipple 10 and held as known in the industry (e.g., by a band/tie 35 which is not visible) and the inner wall 194 (not visible) of the modified U-shaped formed tape 180 covers the base of the collar nipple 10 and part of the duct core 32. Not shown in FIG. 27, the vapor barrier 34 is pushed into the modified U-shaped formed tape 180 and the outward flare 192 of the modified U-shaped formed tape 180 is bent towards the vapor barrier 34. It is advantageous to have a cover similar to the cover 43 over the adhesive 182/188 to facilitate insert the insulation 33 and vapor barrier 34. After the insulation 33 and vapor barrier 34 are inserted, the cover is removed (to expose the adhesive 182/188) and the outer wall 199 and outward flare 192 is bent to contact a part of the top surface of the bottom 196 and the outer surface of the vapor barrier 34.

Figure 28:
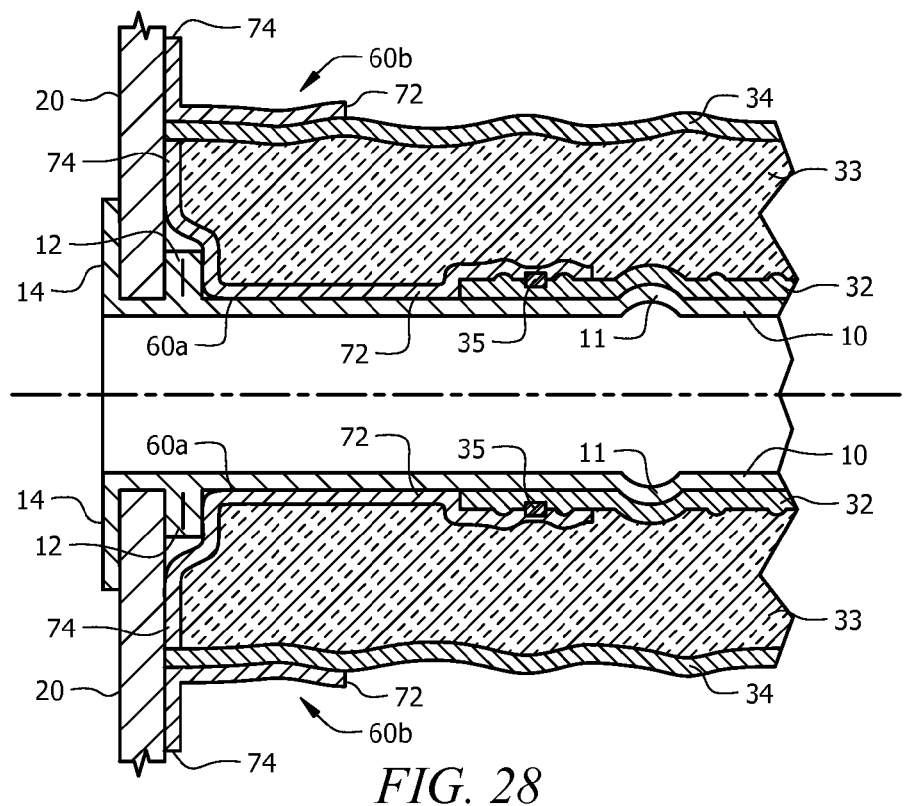
FIG. 28 illustrates a cross-sectional view of the second embodiment of the present invention applied to a duct installation.

Referring to FIG. 28, a cross-sectional view of the second embodiment of the present invention applied to a duct installation is shown. In this, two sections of L-shaped formed tape 60A/B are used. The bottom 74 of a first section 60A adheres to the box 20/flange 12 and the inner wall 72 adheres to and covers the base of the collar nipple 10, also covering an end part of the flexible duct core 32 and (in this example) the band 35 (in some methods, the band 35 is on the outside of the L-shaped formed tape 60A). The bottom 74 of the second section 60B adheres to the box 20 and the inner wall 72 of the second section 60B adheres to the duct's vapor barrier 34. In this view, the insulation 33 is visible between the duct core 32 and the vapor barrier 34. Visible is the bead 11 on the collar nipple 10. The bead 11 along with the band 35 holds the duct core 32 to the collar nipple 10. In some methods, an additional band 35 is used over the inner wall 72 of the L-shaped formed tape 60B.

Figure 29:
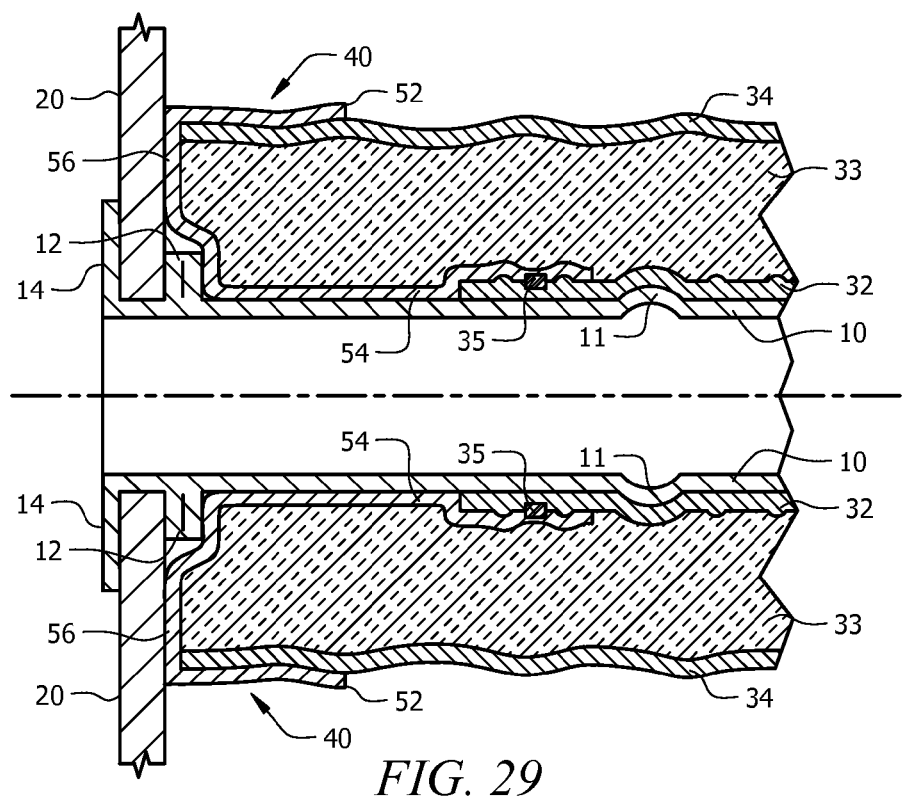
FIG. 29 illustrates a cross-sectional view of the first embodiment of the present invention applied to a duct installation.

Referring to FIG. 29, a cross-sectional view of the first embodiment of the present invention applied to a duct installation is shown. In this, one section of the U-shaped formed tape 40 is used. The bottom 56 adheres to the box 20/flange 12 and the inner wall 54 adheres to and covers the base of the collar nipple 10, also covering an end part of the duct core 32 and, as shown, the band 35. The curved planar outer wall 52 adheres to the outside edge surface of the vapor barrier 34. In some embodiments, an additional band 35 (not shown) is used over the curved planar outer wall 52 of the U-shaped formed tape 40.

Figure 30A:
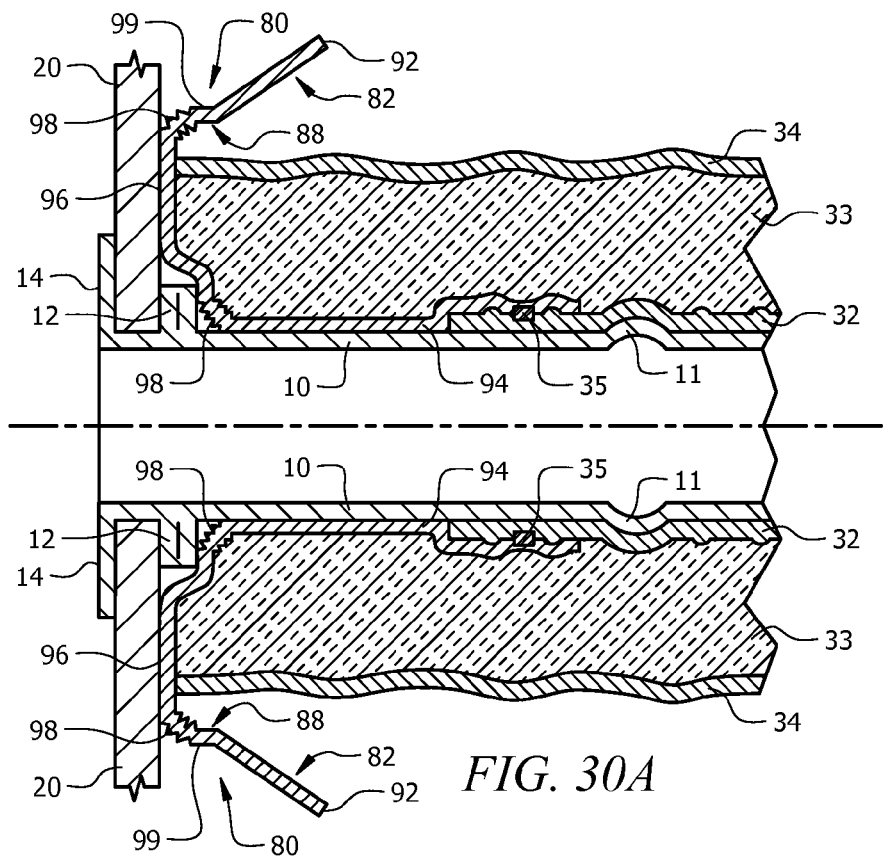
FIGS. 30A-C illustrate step-by-step cross-sectional views of the third embodiment of the present invention applied to a duct installation.
Figure 30B:
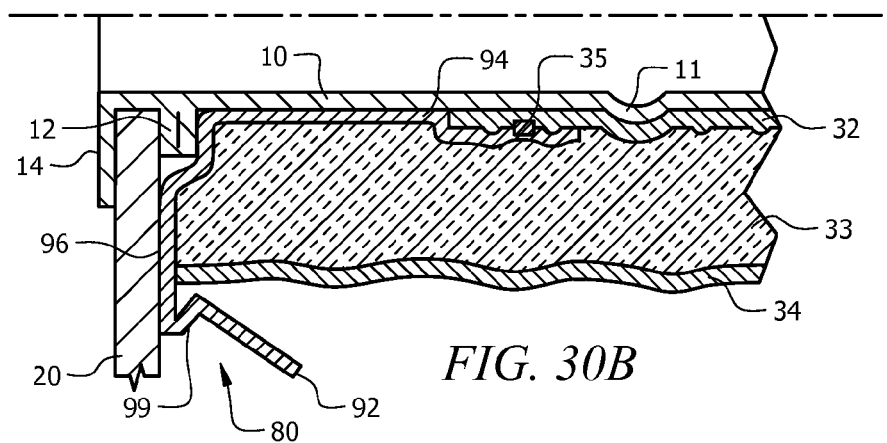
Figure 30C:
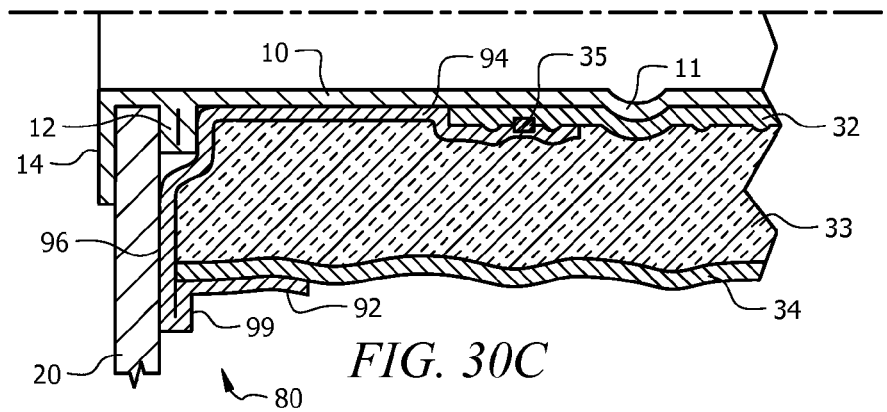

Referring to FIGS. 30A-C, a step-by-step cross-sectional view of the third embodiment of the present invention applied to a duct installation is shown. In this, one section of the modified U-shaped formed tape 80 is used. The bottom 96 adheres to the box 20/flange 12 and the inner wall 94 adheres to and covers the base of the collar nipple 10, also covering an end part of the duct core 32 and the band 35. The outward flare 92 is shown extended in FIG. 30A. FIG. 30A shows the pleats 98 at the interface between the walls 94/99 and the bottom 96.

In FIG. 30B, the outward flare 92 is partially bent towards the vapor barrier 34 and in FIG. 30C, the outward flare 92 is finished being bent towards the vapor barrier 34 and adheres to the outside edge surface of the vapor barrier 34 and the outer wall 99 adheres to a top surface of the bottom 96.

Figure 31:
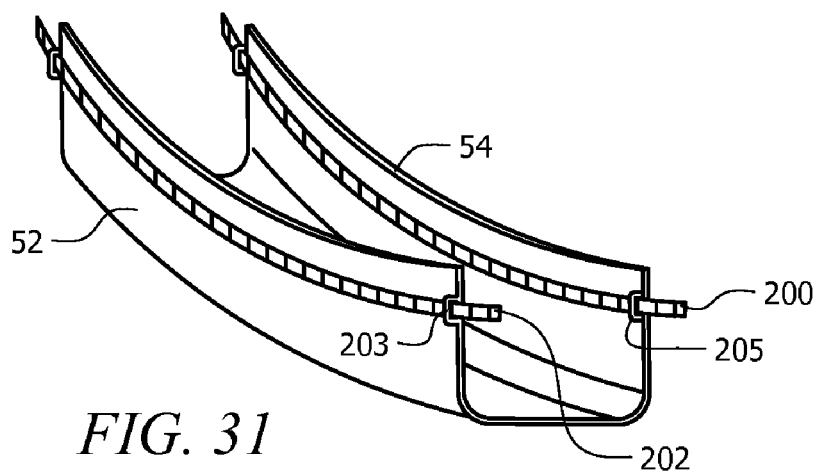
FIG. 31 illustrates a perspective view of the first embodiment of the present invention with integrated tie straps.

Referring to FIG. 31, a perspective view of the first embodiment of the present invention with integrated tie straps or bands 200/202 is shown. Although shown with the U-shaped formed tape 40, the tie straps or bands 200/202 are anticipated for use with any of the disclosed formed tapes 40/60/80/100/120/180. In the version shown, an outer tie strap or band 202 is held to the outer surface of the curved planar outer wall 52 of the U-shaped formed tape 40 by, for example, a plurality of loops 203 or other known connectors and an inner tie strap 200 is held to the inner surface of the curved planar inner wall 54 by, for example, a plurality of loops 205 or other known connectors. In some embodiments, the loops/connectors 203/205 are tunnels that run the part or all of the length of the walls 52/54. The inner tie strap 200 physically holds the duct core 32 to the collar nipple 10 adjacent to the collar bead 11. Likewise, the outer tie strap or band 202 physically holds the vapor barrier 34 and the insulation 33 to the collar nipple 10 as, for example, required by certain building codes. It is preferred, though not required that the loops 203/205 form a slideable interface with the straps 200/202. In some embodiments the loops 203/205 are continuous, forming a tunnel along the side of the inner or outer walls 52/54. Various methods of fastening and tying the ends of the tie strap or band 200/202 are known in the industry. In some embodiments, only one band 200/202 and set of loops 203/205 is present. It is anticipated that the integrated bands 200/202 be connected and tightened around the duct core 10 and/or the vapor barrier 34 and insulation 33 as known in the industry. In some embodiments, the bands 200/202 are on either side of the walls 52/54.

Figure 32:
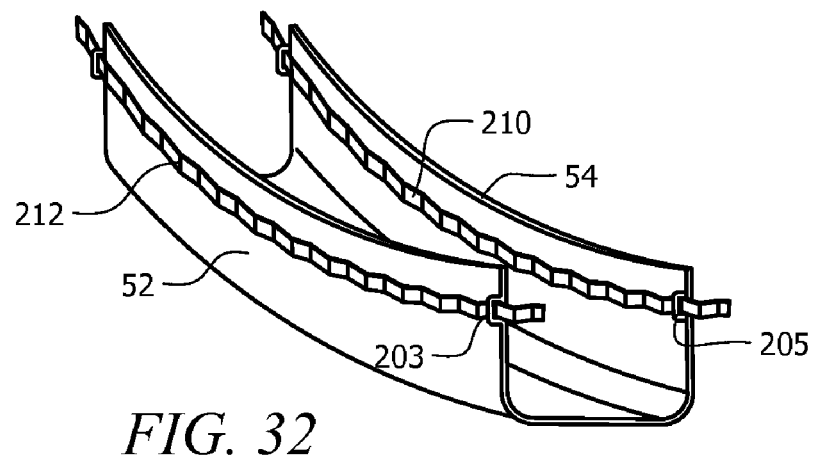
FIG. 32 illustrates a perspective view of the first embodiment of the present invention with integrated fan-fold tie straps.

Referring to FIG. 32, a perspective view of the first embodiment of the present invention with integrated fan-fold tie straps is shown. Although shown with the U-shaped formed tape 40, the fan-folded or wavy tie straps 210/212 are anticipated for use with any of the disclosed formed tapes 40/60/80/100/120/180. In the version shown, an outer fan-folded or wavy tie strap or band 212 is held to the outer surface of the curved planar outer wall 52 of the U-shaped formed tape 40 by a plurality of loops 203 or other known connectors and an inner tie strap 210 is held to the inner surface of the curved planar inner wall 54 by a plurality of loops 205 or other known connectors. The inner tie strap 210 physically holds the duct core 32 to the collar nipple 10 adjacent to the collar bead 11. Likewise, the outer tie strap or band 212 physically holds the vapor barrier to the collar nipple 10 as, for example, required by certain building codes. The waves or fan-folds allow the tie straps 210/212 to be stretched to connect with each other during installation. It is preferred, though not required that the loops 203/205 form a slideable interface with the straps 200/202. In some embodiments the loops 203/205 are continuous, forming a tunnel along the surface of the curved planar inner or outer wall 52/54. In some embodiments, only one band 210/212 and set of loops 203/205 is present. It is anticipated that the integrated bands 210/212 be connected and tightened around the duct core 10 and/or the vapor barrier 34 and insulation 33 as known in the industry. In some embodiments, the bands 210/212 are on either side of the walls 52/54.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A U-shaped tape for sealing a joint interface, the tape comprising;
   a planar wall having a first edge and a distal second edge, the planar wall being formed of a continuous sheet of material conforming to a planar surface and a first side of the planar wall having an adhesive layer; and
   a first curved wall having an edge, wherein the edge and first curved wall have the shape of a segment of a first cylinder, the first curved wall formed of a continuous sheet of material and having an adhesive layer; and
   a second curved wall having a first edge and a second edge, wherein the first edge, second edge, and second curved wall have the shape of a segment of a second cylinder, the second curved wall formed of a continuous sheet of material and an adhesive layer, wherein a diameter of the second cylinder is greater than the first cylinder, and the first and second cylinder share the same center point;
   a flared outer wall having an edge, the flared outer wall formed of a continuous sheet of material, a first side of the flared outer wall having an adhesive layer;
   wherein the first curved wall and the second curved wall extend outwardly from the planar wall in a direction away from and opposing the first side of the planar wall;
   wherein the first edge of the planar wall and the edge of the first curved wall are coincident and meet in an arc; the distal second edge of the planar wall and the first edge of the second curved wall are coincident and meet in an arc; and
   the second edge of the second curved wall and the edge of the flared outer wall are coincident and meet in an arc;
   wherein the adhesive layer of the first curved wall is on a side of the first curved wall that faces away from the second curved wall and the adhesive layer of the second curved wall is on a side of the second curved wall that faces towards the first curved wall.

2. The tape for sealing a joint interface of claim 1, wherein-a first end of the planar wall, a first end of the first curved wall, a first end of the second curved wall, and a first end of the flared outer wall, are overlapped by a second end of the planar wall, a second end of the first curved wall, a second end of the second curved wall, and a second end of the flared outer wall when the first curved wall is installed on the first cylinder.

3. The tape for sealing duct work of claim 1, further comprising removable covers removably covering at least one of the adhesive layers.

4. The tape for sealing a joint interface of claim 3, wherein each of the removable covers further comprises a pull tab.

5. The tape for sealing a joint interface of claim 1, wherein at least one of the planar wall, first curved wall, second curved wall, and flared outer wall has embossing.

6. The tape for sealing a joint interface of claim 1, wherein the tape is provided in sections of a specific length.

7. The tape for sealing a joint interface of claim 1, wherein the tape is provided in rolls.

8. The tape for sealing a joint interface of claim 7, wherein the tape is marked in registrations that are related to PI times a unit of diameter of the first cylinder.

9. The tape for sealing a joint interface of claim 1, further comprising at least one band, each of the at least one bands is slidably affixed to a surface of at least one of the first curved wall and the flared outer wall.

10. The tape for sealing a joint interface of claim 9, wherein the bands include waves allowing for expansion.

11. The tape for sealing a joint interface of claim 1, wherein at least one of the first and distal second edges of the planar wall interface to at least one of the edge of the first curved wall and the first edge of the second curved wall, with a pleat.

12. A method of sealing a take-off duct to a collar nipple, collar flange, and heating air-conditioning box/run, the collar nipple installed in a surface of the heating/air-conditioning box/run, the method comprising, providing a U-shaped tape, the U-shaped tape comprising:
   a planar wall having a first side, an opposing second side, a first edge, and a distal second edge, the planar wall being formed of a continuous sheet of material conforming to a planar surface and the first side of the planar wall having an adhesive layer; and
   a first curved wall having an edge, wherein the edge and first curved wall have the shape of a segment of a first cylinder, the first curved wall formed of a continuous sheet of material and having an adhesive layer; and
   a second curved wall having a first edge and a second edge, wherein the first edge, second edge, and second curved wall have the shape of a segment of a second cylinder, the second curved wall formed of a continuous sheet of material and an adhesive layer, wherein a diameter of the second cylinder is greater than the first cylinder, and the first and second cylinder share the same center point;
   a flared outer wall having an edge, the flared outer wall formed of a continuous sheet of material, a first side of the flared outer wall having an adhesive layer;
   wherein the first curved wall and the second curved wall extend outwardly from the planar wall in a direction away from and opposing the first side of the planar wall;
   wherein the first edge of the planar wall and the edge of the first curved wall are coincident and meet in an arc; the distal second edge of the planar wall and the first edge of the second curved wall are coincident and meet in an arc; and
   the second edge of the second curved wall and the edge of the flared outer wall are coincident and meet in an arc;
   wherein the adhesive layer of the first curved wall is on an inner surface of the first curved wall that faces away from the second curved wall and the adhesive layer of the second curved wall is on an inner surface of the second curved wall that faces towards the first curved wall;
   pulling a vapor barrier and insulation layer back from an end of a duct core of the take-off duct;
   fitting the end of the duct core over the collar nipple;
   securing the take-off duct with a band over the end of the duct core;
   tightening the band;
   affixing the inner surface of the first curved wall to the outer surface of the collar nipple using the adhesive on the inner surface of the first curved wall, the inner surface of the first curved wall covering at least part of the exposed portion of the collar nipple and part of an end of the duct core;
   affixing the first side of the planar wall to the box/run around the collar using the adhesive layer on the first side of the planar wall;
   pushing the insulating layer and the vapor barrier into the tape between the first curved wall and the second curved wall;
   affixing the inner surface of the second curved wall using the adhesive layer on the inner surface of the second curved wall; and
   affixing the flared outer wall using the adhesive layer on the flared outer wall to the vapor barrier of the take-off duct.

13. The method of claim 12, further comprising the step of removing a first removable cover from over the adhesive layer of the first curved wall before the step of affixing the adhesive layer of the first curved wall.

14. The method of claim 12, further comprising the step of removing a second removable cover from over the adhesive layer of the second curved wall and flared outer wall before the step of bending the outwardly flared surface.

15. A tape for sealing a joint interface, the tape forming a modified U-shape, the tape comprising;
   A wall having a first edge, and a second edge, the planar wall being formed of a continuous sheet of material, the wall conforming to a planar surface, and wall having an adhesive layer on the first side; and
   a first curved wall having a first edge, the first curved wall formed of a continuous sheet of material, the first edge and the first curved wall conforming to a cylindrical surface, the first curved wall having an adhesive layer on a first side; and
   a second curved wall having a first edge and a second edge, the second curved wall formed of a continuous sheet of material, wherein the first edge, second edge, and the second curved wall conforming to a cylindrical surface, the second curved wall having an adhesive layer on a first side, the second curved wall having a diameter greater than a diameter of an outer surface of a duct vapor barrier, the diameter of the second curved wall is greater than the first curved wall, and the first and second diameters share the same center point; and
   a flared outer wall having an edge, the flared outer wall formed of a continuous sheet of material, a first side of the flared outer wall having an adhesive layer;
   wherein the first curved wall and the second curved wall extend outwardly from the wall in a direction away from and opposing the first side of the wall;
   wherein the first edge of the wall and the edge of the first curved wall are coincident, and the first edge of the wall and the edge of the first curved wall and meet in an arc;
   wherein the second edge of the wall and the first edge of the second curved wall are coincident, and the second edge of the wall and the first edge of the second curved wall and meet in an arc;
   the second edge of the second curved wall and the edge of the flared outer wall are coincident, and the second edge of the second curved wall and the edge of the flared wall meet in an arc, the combination of the wall, first curved wall, second curved wall, and flared wall forming a modified U-shaped cross-section in which a flared wall portion of a leg of the U-shape flares outwardly; and wherein the adhesive layer of the first curved wall is on a side of the first curved wall that faces away from the second curved wall and the adhesive layer of the second curved wall is on a side of the second curved wall that faces towards the first curved wall.

16. The tape for sealing a joint interface of claim 15, wherein when installed, a first end of the wall is overlapped by a distal end of the wall, a first end of the first curved wall is overlapped by a distal end of the first curved wall, a first end of the second curved wall is overlapped by a distal end of the second curved wall, and a first end of the flared wall is overlapped by a distal end of the flared wall.

17. The tape for sealing a joint interface of claim 16, further comprising at least one removable cover removably covering at least one of the adhesive layers.

18. The tape for sealing a joint interface of claim 15, wherein the tape is provided in sections of a specific length.

19. The tape for sealing a joint interface of claim 15, further comprising at least one band, each of the at least one band slidably affixed to a surface of one of the first curved wall, and the flared wall.

20. The tape for sealing a joint interface of claim 15, wherein at least one of the edge of the first curved wall is interfaced to the first edge of the wall and the first edge of the second curved wall is interfaced to the second edge of the wall, by a pleat.

* * * * *